(12) United States Patent
Sato et al.

(10) Patent No.: US 12,137,197 B2
(45) Date of Patent: Nov. 5, 2024

(54) INFORMATION PROCESSING APPARATUS, INFORMATION PROCESSING SYSTEM, INFORMATION PROCESSING METHOD, AND NON-TRANSITORY RECORDING MEDIUM SELECTING A PRINTING PAPER ACCORDING TO AN OPERATION INDICATING WHETHER TO ACCEPT OR REJECT A PRESENTED COLOR CONVERSION DICTIONARY

(71) Applicants: Chiharu Sato, Kanagawa (JP); Yukiko Maeo, Kanagawa (JP)

(72) Inventors: Chiharu Sato, Kanagawa (JP); Yukiko Maeo, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 18/360,860

(22) Filed: Jul. 28, 2023

(65) Prior Publication Data
US 2024/0073351 A1 Feb. 29, 2024

(30) Foreign Application Priority Data
Aug. 31, 2022 (JP) .................................. 2022-138351

(51) Int. Cl.
*H04N 1/60* (2006.01)
*H04N 1/00* (2006.01)

(52) U.S. Cl.
CPC ....... *H04N 1/6097* (2013.01); *H04N 1/00482* (2013.01); *H04N 1/6038* (2013.01)

(58) Field of Classification Search
CPC ............................................ H04N 1/60–6097
See application file for complete search history.

(56) References Cited

U.S. PATENT DOCUMENTS

| | | | |
|---|---|---|---|
| 7,474,784 B2* | 1/2009 | Hasegawa ............ | H04N 1/6097 382/167 |
| 8,743,407 B2* | 6/2014 | Shinchi .................. | H04N 1/603 358/1.15 |
| 2018/0189617 A1* | 7/2018 | Feng ....................... | G06K 15/16 |
| 2021/0329146 A1* | 10/2021 | Matsuo ............. | H04N 1/00087 |
| 2022/0019392 A1 | 1/2022 | Maeo | |
| 2023/0171367 A1 | 6/2023 | Matsushima et al. | |

FOREIGN PATENT DOCUMENTS

| JP | 2015-087513 A | 5/2015 |
|---|---|---|
| JP | 2021-101502 A | 7/2021 |

\* cited by examiner

*Primary Examiner* — Barbara D Reinier
(74) *Attorney, Agent, or Firm* — Harness, Dickey & Pierce, P.L.C.

(57) ABSTRACT

An information processing apparatus, an information processing system, an information processing method, and a non-transitory recording medium. The information processing apparatus acquires a print job, selects printing paper according to an operation on an operation device, acquires a color conversion dictionary from among color conversion dictionaries corresponding to respective representative paper sorted into a plurality of groups based on physical property of the selected printing paper, presents information on the color conversion dictionary through a display, receives an operation input indicating whether to accept or to reject a presented color conversion dictionary through the operation device, and converts color information of the print job using the color conversion dictionary accepted by the operation input received through the operation device.

10 Claims, 16 Drawing Sheets

FIG. 15A

| COLOR NAME | L* | a* | b* |
|---|---|---|---|
| PANTONE SILVER 10077 C | 68.89 | −0.77 | −1.23 |
| PANTONE 10449 C | 75.04 | −0.42 | 2.11 |
| PANTONE 8160 C | 58.05 | 1.8 | −7.63 |
| PANTONE 10262 C | 62.48 | −3.64 | −6.85 |
| PANTONE 8460 C | 58.36 | 2.26 | −2.59 |
| PANTONE 10310 C | 64.78 | −5.12 | 4.54 |
| PANTONE 8120 C | 57.97 | 5.6 | −7.1 |

FIG. 15B

| COLOR NAME | C | M | Y | K | Si |
|---|---|---|---|---|---|
| PANTONE SILVER 10077 C | 0 | 0 | 0 | 5 | 80 |
| PANTONE 10449 C | 5 | 0 | 15 | 0 | 85 |
| PANTONE 8160 C | 10 | 15 | 30 | 15 | 80 |
| PANTONE 10262 C | 25 | 0 | 0 | 10 | 80 |
| PANTONE 8460 C | 10 | 20 | 5 | 15 | 80 |
| PANTONE 10310 C | 10 | 0 | 25 | 10 | 80 |
| PANTONE 8120 C | 15 | 35 | 0 | 10 | 80 |

FIG. 15C

| COLOR NAME | C | M | Y | K | Si |
|---|---|---|---|---|---|
| PANTONE SILVER 10077 C | 0 | 0 | 0 | 5 | 100 |
| PANTONE 10449 C | 0 | 0 | 0 | 0 | 100 |
| PANTONE 8160 C | 0 | 5 | 20 | 10 | 100 |
| PANTONE 10262 C | 0 | 15 | 20 | 5 | 100 |
| PANTONE 8460 C | 0 | 10 | 0 | 10 | 100 |
| PANTONE 10310 C | 0 | 0 | 20 | 5 | 100 |
| PANTONE 8120 C | 10 | 25 | 0 | 10 | 95 |

INFORMATION PROCESSING APPARATUS, INFORMATION PROCESSING SYSTEM, INFORMATION PROCESSING METHOD, AND NON-TRANSITORY RECORDING MEDIUM SELECTING A PRINTING PAPER ACCORDING TO AN OPERATION INDICATING WHETHER TO ACCEPT OR REJECT A PRESENTED COLOR CONVERSION DICTIONARY

CROSS-REFERENCE TO RELATED APPLICATIONS

This patent application is based on and claims priority pursuant to 35 U.S.C. § 119(a) to Japanese Patent Application No. 2022-138351, filed on Aug. 31, 2022, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Background Art

In recent electrophotographic printing, special colorants are sometimes used, in addition to conventionally used cyan, magenta, yellow, and black (CMYK) colorants, to expand color expression. For example, by using a metallic colorant having metallic luster such as gold toner and silver toner, a pearl colorant, and a glittering colorant such as a mica colorant, a glossy color image is formed. In the following description, a color produced by the glittering colorant is referred to as a metallic color. Offset printing using the glittering colorants has been the mainstream for printing the metallic colors.

In the offset printing, color sample patches are commercially available for a purpose of printing an ideal metallic color, and a user designates a color with the color sample patch. As illustrated in FIG. 22, colorants are mixed to reproduce the color sample patch, and a printing company uses mixed colorants for printing on printing paper. Colors registered in a color sample book are called spot colors (special colors).

On the other hand, in electrophotographic printing, an image is formed by overlapping layers of color toners as illustrated in FIG. 23. Unlike the offset printing, colorants are not mixed, and printing is possible on demand. A disadvantage is that the color toner of the lower layer may be covered with the color toner of the upper layer according to order in which the toners are stacked. In general, metallic toner using metal have higher shielding properties than process color toners using pigments. Therefore, the metallic toner is often placed in the bottom layer closest to paper.

In color reproduction of metallic spot colors in the electrophotographic printing, a plurality of device values are provided so that colors do not change even on different printing papers. In order to determine the device value according to the printing paper, a technique is disclosed for sorting the printing paper based on presence or absence of coating on a surface of the printing paper, a name of the printing paper, and degree of similarity based on properties of the printing paper stored in a storage unit. Among the properties of the printing paper, physical properties of the printing paper surface are major factors affecting the reproduction of metallic colors.

However, for newly purchased printing paper, the physical properties are not available. In a case the sorting is performed by the presence or absence of the coating on the surface of the printing paper or by the name of the printing paper, the number of sorts increases, and many color conversion dictionaries corresponding to each sort of paper are to be prepared.

SUMMARY

Embodiments of the present disclosure describe an information processing apparatus, an information processing system, an information processing method, and a non-transitory recording medium. According to one embodiment, the information processing apparatus acquires a print job, selects printing paper according to an operation on an operation device, acquires a color conversion dictionary from among color conversion dictionaries corresponding to respective representative paper sorted into a plurality of groups based on physical property of the selected printing paper, presents information on the color conversion dictionary through a display, receives an operation input indicating whether to accept or to reject a presented color conversion dictionary through the operation device, and converts color information of the print job using the color conversion dictionary accepted by the operation input received through the operation device.

According to one embodiment, the information processing system acquires colorimetric values of target color patches on a plurality of kinds of printing paper measured by a measuring instrument and physical property of the plurality of kinds of printing paper measured by the measuring instrument sorts the plurality of kinds of printing paper into a plurality of groups based on the physical property, selects representative paper from the printing paper belonging to each of the groups, creates a color conversion dictionary corresponding to the representative paper from colorimetric values of the representative paper and includes the information processing apparatus.

According to one embodiment, the information processing method includes acquiring a print job, selecting printing paper according to an operation on an operation device, acquiring a color conversion dictionary from among the color conversion dictionaries corresponding to respective representative paper sorted into a plurality of groups, based on physical property of the selected printing paper, presenting information on the color conversion dictionary through a display, receiving an operation input indicating whether to accept or to reject a presented color conversion dictionary through the operation device, and converting color information of the print job, using the color conversion dictionary accepted by the received operation input.

According to one embodiment, the non-transitory recording medium storing a plurality of instructions which, when executed by one or more processors, causes the processors to perform an information processing method including acquiring a color conversion dictionary from among color conversion dictionaries corresponding to respective representative paper sorted into a plurality of groups, based on physical property of the selected printing paper, presenting information on the color conversion dictionary through a display, receiving an operation input indicating whether to accept or to reject a presented color conversion dictionary through the operation device, and converting color information of the print job, using the color conversion dictionary accepted by the received operation input.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 15A, 15B, and 15C are tables illustrating examples of color conversion dictionaries;

Figure 1:
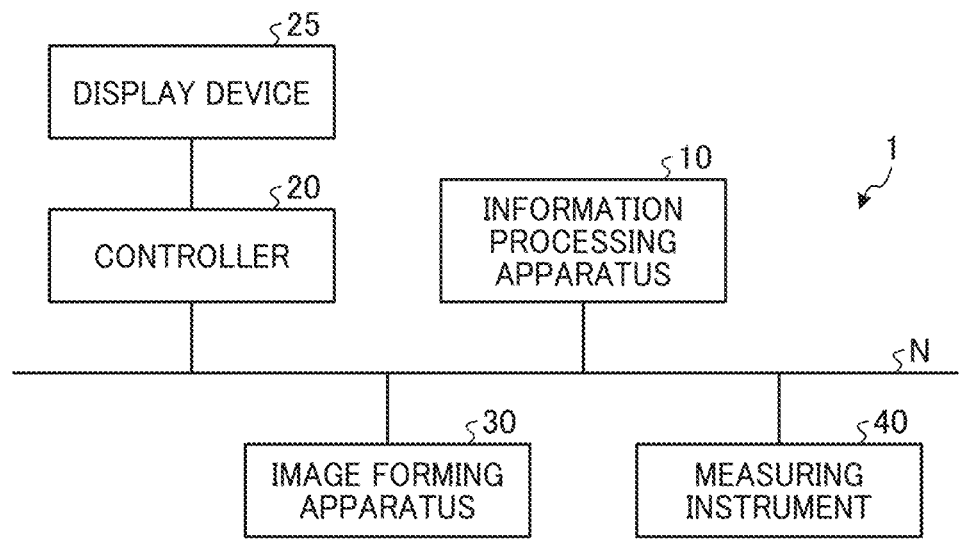
FIG. 1 is a diagram illustrating an example of an overall configuration of an information processing system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to accompanying drawings, a detailed description is given of several embodiments of an information processing apparatus, an information processing system, an information processing method and a non-transitory recording medium. The present disclosure, however, is not limited to the following embodiments, and the constituent elements of the following embodiments include elements that can be easily conceived by those skilled in the art, those being substantially the same ones, and those being within equivalent ranges. Furthermore, various omissions, substitutions, changes and combinations of the constituent elements can be made without departing from the gist of the following embodiments.

FIG. 1 is a diagram illustrating an example of an overall configuration of an information processing system according to a first embodiment. An overall configuration of the information processing system 1 according to the present embodiment is described with reference to FIG. 1.

As illustrated in FIG. 1, the information processing system 1 includes an information processing apparatus 10, a controller 20, a display device 25 (display unit), an image forming apparatus 30, and a measuring instrument 40. The information processing apparatus 10, the controller 20, the image forming apparatus 30, and the measuring instrument 40 are capable of data communication with each other through a network N such as a local area network (LAN).

The measuring instrument 40 is a device that measures glossiness or smoothness of printing paper and transmits a measurement result to the information processing apparatus 10. Further, the measuring instrument 40 performs colorimetry on a patch of a target color on the printing paper from a plurality of directions, and transmits obtained colorimetric values to the information processing apparatus 10. The measuring instrument 40 is, for example, a gloss meter, a smoothness tester, a multi-angle spectrophotometer, or the like. The glossiness is one of physical property of a paper surface (hereinafter sometimes referred to as surface properties), and is a numerical value that indicates apparent "gloss" of the paper surface. The smoothness is one of the surface characteristics, and is a numerical value representing flatness and roughness of the paper surface. Also, the target colors are, for example, color numbers 599 to 621 of the device independent color (DIC) color guide, or colors of color patches (metallic patches, etc.) formed by offset printing such as PANTONE Metallic Coated Guide.

The information processing apparatus 10 sorts the printing paper according to the glossiness or smoothness measured by the measuring instrument 40, selects a representative paper from the sorted group, and calculates values based on colorimetric values (metallic values and color values to be described below). The information processing apparatus 10 is an information processing apparatus such as a personal computer (PC) or a workstation that derives a device value corresponding to the representative paper from a value and creates a color conversion dictionary. The device value indicates a five-color device value obtained by adding metallic silver (Si) to cyan (C), magenta (M), yellow (Y), and black (K), which are process colors. "High metallicity" and "high metallic value" are equivalent to "high brightness", and "strong (high) color" and "high color value" are equivalent to "high saturation" or "colorful". The metallicity indicates a degree of metallic luster.

The controller 20 is an information processing apparatus such as a digital front end (DFE) that presents information of the color conversion dictionary created by the information processing apparatus 10 on the display device 25, performs color conversion for a print job in which spot colors are designated using the color conversion dictionary permitted to be used by the user, transmits color-converted print job to the image forming apparatus 30 and causes the image forming apparatus 30 to print the print job.

The display device 25 is a device such as a liquid crystal display or an organic electroluminescence (EL) display for presenting the information of the color conversion dictionary to the user under the control of the controller 20 and prompting the user to enter permission or rejection of the color conversion dictionary. The display device 25 may be a touch panel including an input function and a display function.

The image forming apparatus 30 is a printing apparatus for printing the image data under the control of the controller 20. In the present embodiment, the image forming apparatus 30 is described as an apparatus that performs a printing operation by electrophotographic printing.

Figure 2:
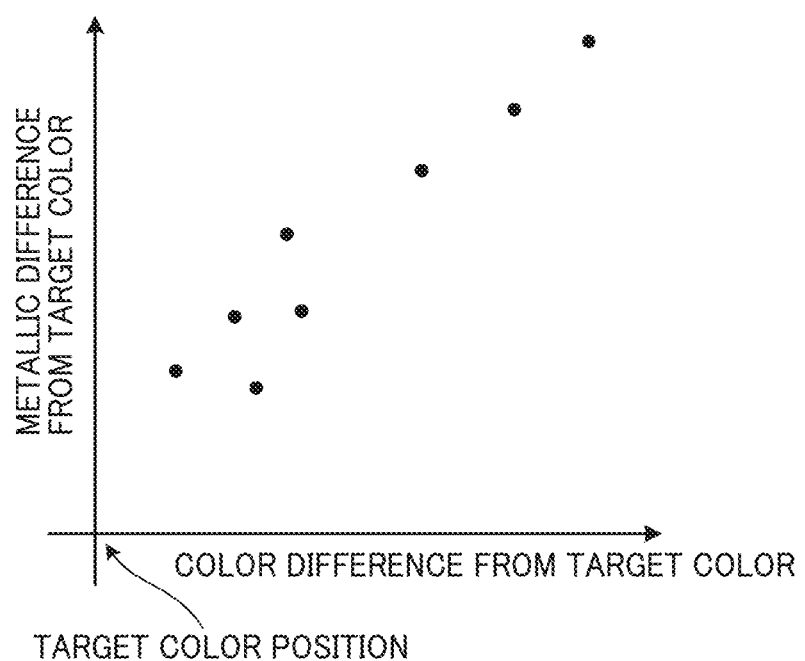
FIG. 2 is a diagram illustrating an example of relationship between metallic difference and color difference of target colors on multiple kinds of printing paper.
Figure 3:
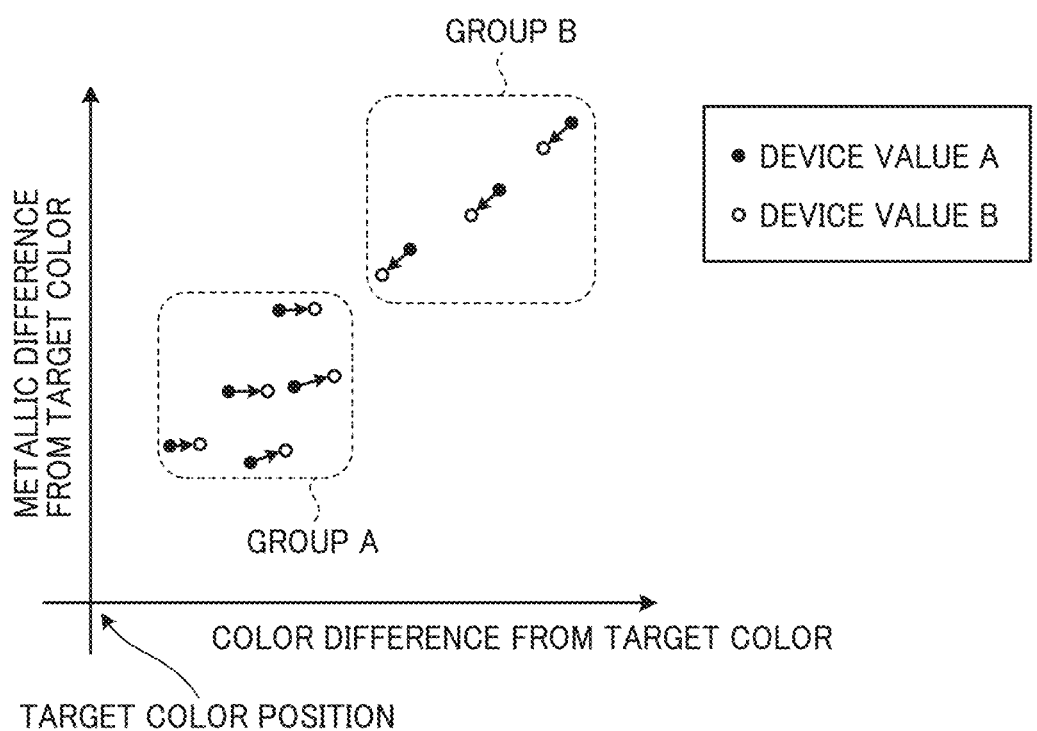
FIG. 3 is a diagram illustrating an example state in which the multiple kinds of printing paper are grouped based on the relationship between the metallic difference and color difference.
Figure 4:
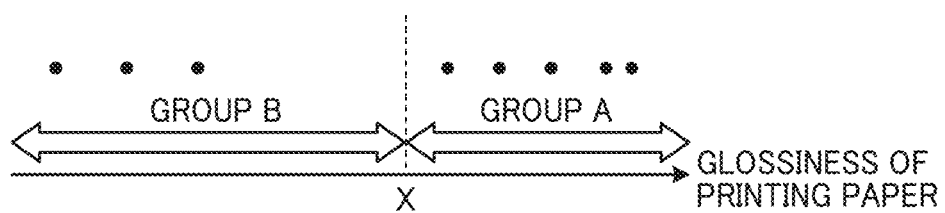
FIG. 4 is a diagram illustrating sorting of the printing paper into groups based on glossiness.
Figure 5:
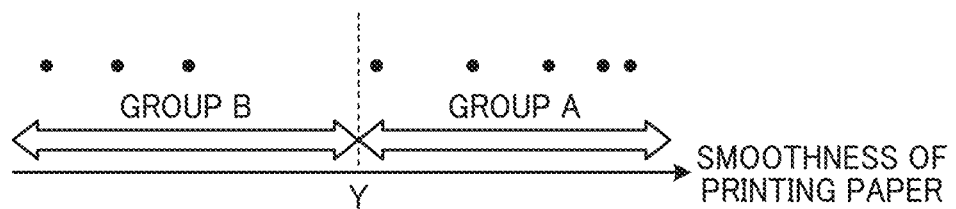
FIG. 5 is a diagram illustrating sorting of the printing paper into groups based on smoothness.

FIG. 2 is a diagram illustrating an example of relationship between metallic difference and color difference of the target colors on multiple kinds of printing paper. FIG. 3 is a diagram illustrating a state in which the multiple kinds of the printing paper are grouped based on the relationship between the metallic difference and color difference. FIG. 4 is a diagram illustrating sorting of the printing paper into groups based on glossiness. FIG. 5 is a diagram illustrating sorting of the printing paper into groups based on smoothness; The sorting of printing paper by the information processing apparatus 10 according to the present embodiment is described with reference to FIGS. 2 to 5.

In a graph in FIG. 2, plots indicate respective differences (metallic difference and color difference) from the metallic and color values of the target color calculated from colorimetric values obtained by colorimetric measurement of a printed portion (patch) of the target color printed on the printing paper with different surface characteristics, using identical device values to reproduce the target color of the color sample. In FIG. 2, a horizontal axis indicates the color difference from the target color (metallic color), and the vertical axis indicates the metallic difference from the target color (metallic color).

The metallic value is a physical quantity that quantifies a degree of metallicity of an object measured by the measuring instrument 40, and is generally calculated using colorimetric values measured in multiple directions. The color value is a physical quantity that quantifies a degree of color (chromaticity) of an object measured by the measuring instrument 40. The metallic difference is a differential value with respect to the metallic value of the target color and a certain metallic value. The color difference is a differential value with respect to a color value of a target value for a certain color value.

In FIG. 2, the device value used to reproduce the target color of the color sample (hereinafter referred to as a device value a) is determined by optimizing the printing paper whose surface characteristics are similar to those of the color sample. FIG. 3 indicates plots of metallic difference and color difference calculated in the same manner after printing out on the printing paper having different surface characteristics, with the device value (hereinafter referred to as a device value b) optimized for the printing paper that is rougher than the surface characteristics of the color sample.

For the printing paper in which both the metallic difference and the color difference for the device value a are large, the use of the device value b improves both the metallic difference and the color difference, and shifts to a smaller direction. On the other hand, for the printing paper in which both the metallic difference and the color difference for the device value a are small, the use of the device value a shifts in the direction in which both the metallic difference and the color difference increase. As illustrated in FIG. 3, the printing paper in which the metallic difference and color difference are improved by the device value a is sorted as group A, and the printing paper in which the metallic difference and color difference are improved by the device value b is sorted as group B. An experiment revealed that the amount of the metallic color material is relatively larger and the amount of the process color material is smaller with the device value b than with the device value a.

FIG. 4 illustrates the glossiness of each of the printing paper described in FIGS. 2 and 3. The horizontal axis indicates a degree of glossiness, and a dotted line indicates a boundary of the groups. FIG. 5 illustrates the smoothness of each printing paper described in FIGS. 2 and 3. The horizontal axis indicates a degree of smoothness, and the dotted line indicate the boundary of the groups. The difference between group A and group B described above can be explained by distribution of the glossiness or smoothness of the printing paper. Specifically, the printing paper can be sorted using a predetermined value X for glossiness and a predetermined value Y for smoothness as boundaries. As illustrated in FIGS. 4 and 5, group A, which has high glossiness and smoothness, tends to have a small metallic difference. Since the metallic difference tends to be small, the reproducibility of the metallicity (metallic reproducibility) is used as the reproduction property. On the other hand, group B uses tint reproducibility (color reproducibility) as the reproduction property.

In the above description, the printing paper is sorted into two groups, but the present disclosure is not limited to this example, and the printing paper may be sorted into three or more groups. In this case, the higher the glossiness or smoothness of the printing paper to which the group belongs, the metallicity is more focused as the reproduction property, and the lower the glossiness or smoothness of the group, the color reproducibility is more focused as the reproduction property.

Figure 6:
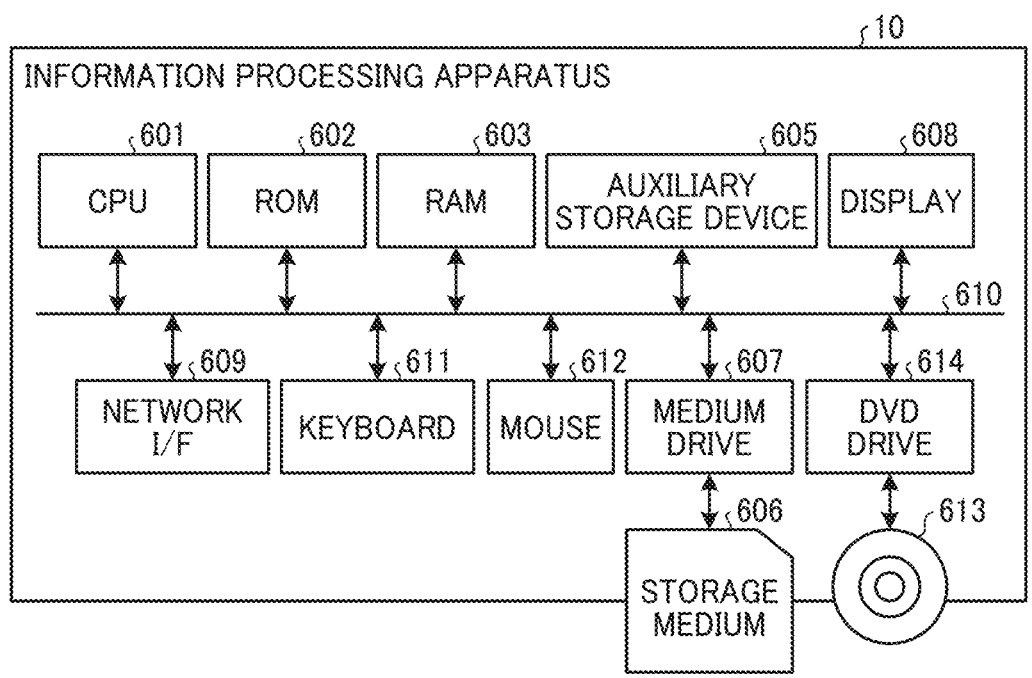
FIG. 6 is a block diagram illustrating an example of a hardware configuration of an information processing apparatus according to the first embodiment.

FIG. 6 is a block diagram illustrating an example of a hardware configuration of an information processing apparatus according to the first embodiment. The hardware configuration of the information processing apparatus 10 according to the present embodiment is described with reference to FIG. 6.

As illustrated in FIG. 6, the information processing apparatus 10 includes a central processing unit (CPU) 601, a read only memory (ROM) 602, a random access memory (RAM) 603, an auxiliary storage device 605, a medium drive 607, a display 608, a network interface (I/F) 609, a keyboard 611, a mouse 612, and a digital versatile disc (DVD) drive 614.

The CPU 601 is a processor that controls an entire operation of the information processing apparatus 10. The ROM 602 is a non-volatile storage device that stores a program for the information processing apparatus 10. The RAM 603 is a volatile storage device used as a work area for the CPU 601.

The auxiliary storage device 605 is a storage device such as a hard disk drive (HDD) or a solid state drive (SSD) that stores a color prediction model and a color conversion dictionary, which are described below, as well as various data and programs. The medium drive 607 controls reading and writing of data from and to a storage medium 606 such as a flash memory according to the control of the CPU 601.

The display 608 is a display device implemented by a liquid crystal or an organic electro-luminescence (EL) for displaying various information such as a cursor, a menu, a window, characters, or an image.

The network I/F 609 is an interface for communicating data with an external device such as the controller 20 and the measuring instrument 40 using the network N. The network I/F 609 is, for example, a network interface card (NIC) or the like that supports ETHERNET (registered trademark) and is capable of communication conforming to transmission control protocol/internet protocol (TCP/IP) or the like.

The keyboard 611 is an input device for selecting characters, numbers, various instructions, moving a cursor, and the like. The mouse 612 is an input device for selecting and executing various instructions, selecting a processing target, moving a cursor, and the like.

The DVD drive 614 is a device that controls reading and writing of data from and to a DVD 613 such as a digital versatile disc read only memory (DVD-ROM) or a digital versatile disc recordable (DVD-R) as an example of a removable storage medium.

The CPU 601, ROM 602, RAM 603, auxiliary storage device 605, medium drive 607, display 608, network I/F 609, keyboard 611, mouse 612, and DVD drive 614 are capable of communicating with each other through a bus 610 such as an address bus and a data bus.

The hardware configuration of the information processing apparatus 10 illustrated in FIG. 6 is an example and may not include all the components illustrated in FIG. 2 or may include other components. The hardware configuration of the controller 20 conforms to the hardware configuration illustrated in FIG. 6. However, in the case of the controller 20, the display 608 corresponds to the display device 25 illustrated in FIG. 1.

Figure 7:
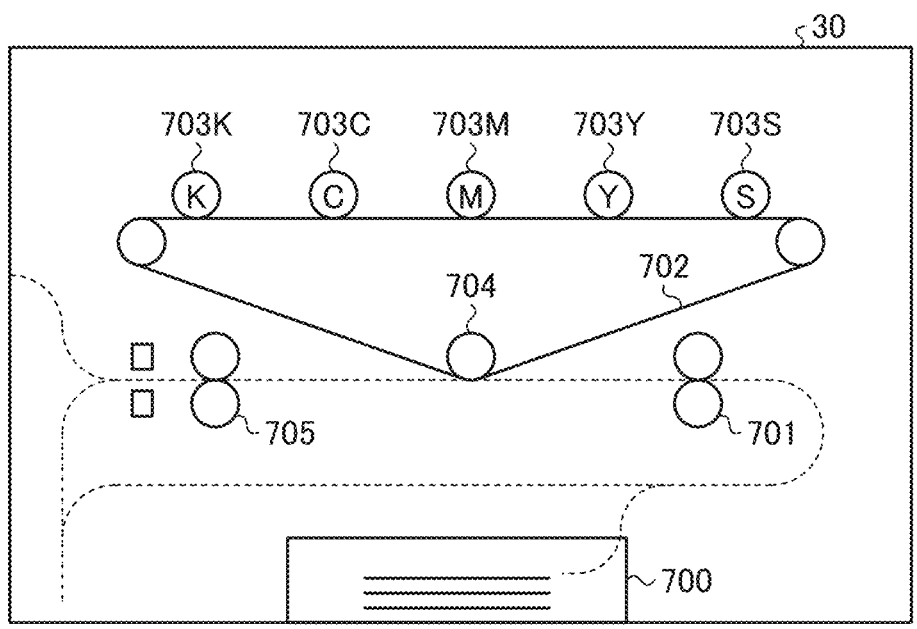
FIG. 7 is a diagram illustrating an example of a hardware configuration of an image forming apparatus according to the first embodiment.

FIG. 7 is a diagram illustrating an example of a hardware configuration of an image forming apparatus according to the first embodiment. The hardware configuration of the image forming apparatus 30 according to the present embodiment is described with reference to FIG. 7.

As illustrated in FIG. 7, the image forming apparatus 30 is, for example, a tandem type printing apparatus, and includes a paper feed tray 700, conveyance rollers 701, an intermediate transfer belt 702, photoconductor drums 703C, 703M, 703Y, 703K, 703S, a transfer roller 704 and a fixing roller pair 705.

The paper feed tray 700 is a tray in which recording media such as paper for feeding are accommodated. The conveyance rollers 701 are a pair of rollers that transport the recording medium fed from the paper feed tray 700 to the transfer roller 704 along the transport path.

The intermediate transfer belt 702 is an endless belt on which an intermediate transfer image is formed by the photoconductor drums 703C, 703M, 703Y, 703K, and 703S. The intermediate transfer belt 702 rotates clockwise in FIG. 7, and toner images of respective colors are formed one above the other on the photoconductor drums 703K, 703C, 703M, 703Y, and 703S in this order.

The photoconductor drum 703C is a photoconductor drum for forming a cyan toner image on the intermediate transfer belt 702. The photoconductor drum 703M is a photoconductor drum for forming a magenta toner image on the intermediate transfer belt 702. The photoconductor drum 703Y is a photoconductor drum for forming a yellow toner image on the intermediate transfer belt 702. The photoconductor drum 703K is a photoconductor drum for forming a black toner image on the intermediate transfer belt 702. The photoconductor drum 703S is a photoconductor drum for forming a toner image of a special color on the intermediate transfer belt 702. The special color is, for example, a metallic colorant having a metallic luster such as a gold toner or a silver toner, a pearl colorant, a glitter colorant such as a mica colorant, or the like. In order to form an intermediate transfer image on the intermediate transfer belt 702, the photoconductor drums 703S, 703Y, 703M, 703C, and 703K are arranged in this order from the upstream in rotation direction of the intermediate transfer belt 702. As a result of forming a toner image of each color, a full-color image is formed as an intermediate transfer image on the surface of the intermediate transfer belt 702. The photoconductor drums 703C, 703M, 703Y, 703K, and 703S are simply referred to as "photoconductor drums 703" when indicating the photoconductor drum of any color or collectively. Further, the photoconductor drum 703 is configured with CMYK process colors, but cyan, magenta, and yellow (CMY) colors may be used as process colors, or red, green, and blue (RGB) may be used instead of CMY colors.

The transfer roller 704 is a roller that transfers the full-color image (intermediate transfer image) formed on the intermediate transfer belt 702 onto the recording medium conveyed by the conveyance rollers 701. A full-color image is formed (printed) on the recording medium by the function of the transfer roller 704.

A metallic color layer is a bottom layer of the full-color image formed on the recording medium due to the formation order of the colors of the intermediate transfer image on the intermediate transfer belt 702 described above, forming "underlayer" of the metallic colorant.

The fixing roller 705 is a roller for fixing the image on the recording medium on which the full-color image is formed.

Figure 8:
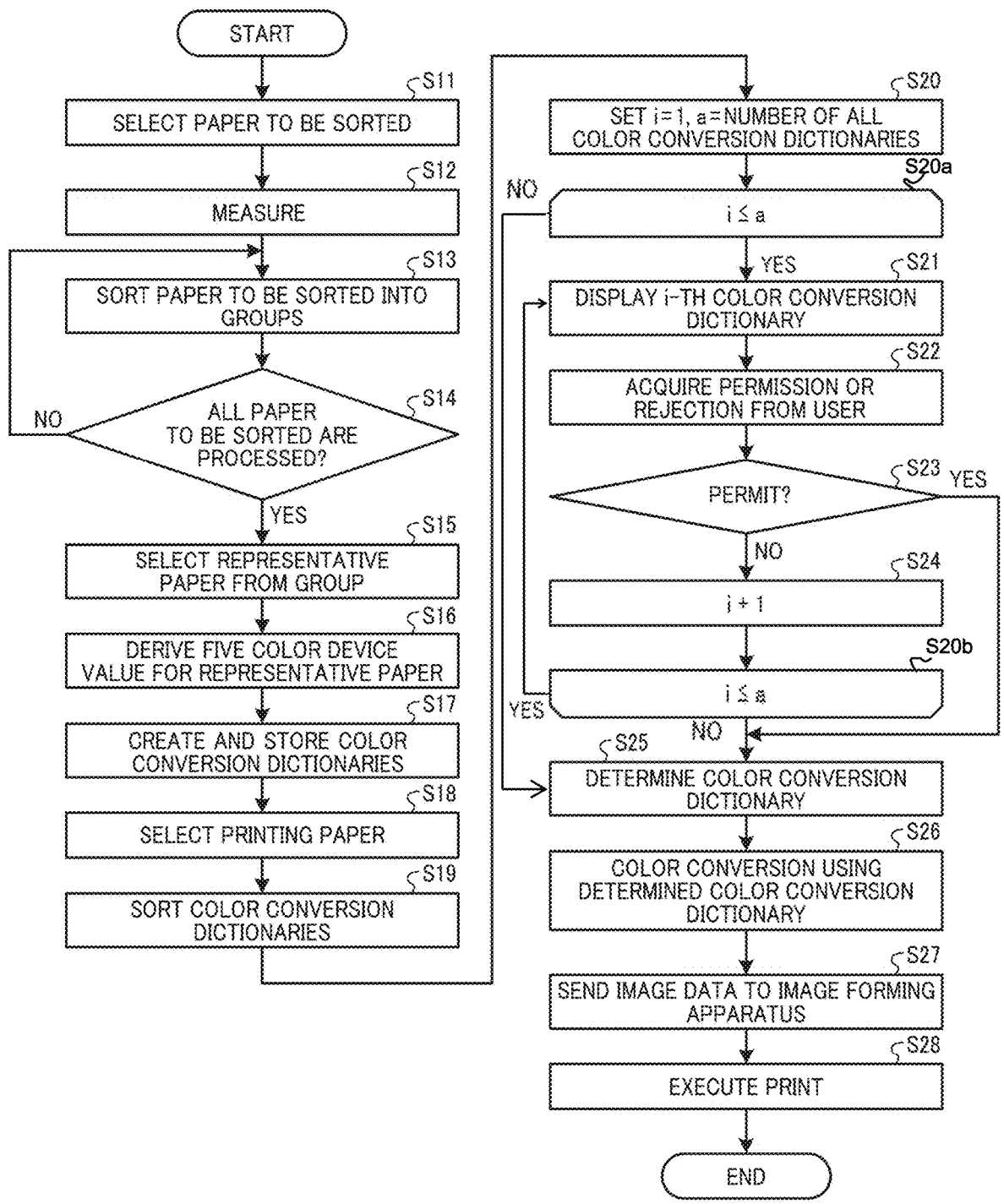
FIG. 8 is a flowchart illustrating an example of an overall operation of the information processing system according to the first embodiment.

FIG. 8 is a flowchart illustrating an example of an overall operation of the information processing system according to the first embodiment. The overall operation of the information processing system 1 according to the present embodiment is described with reference to FIG. 8.

In step S11, the user selects the multiple kinds of printing paper to be sorted (sorting target paper). Specifically, the measuring instrument 40 is provided with multiple kinds of printing paper, selected by the user. Then, the process proceeds to step S12.

In step S12, in response to a request from the user, the measuring instrument 40 measures the surface of the paper to be sorted. For example, the user may cause the measuring instrument 40 to perform a measuring operation by directly operating the measuring instrument 40, or may cause the measuring instrument 40 to perform the measuring operation through the input devices (keyboard 611 and mouse 612) of the information processing apparatus 10. The information processing apparatus 10 receives from the measuring instrument 40 the glossiness or smoothness of the sorting target paper and the colorimetric value of the printed portion of the target color of the sorting target paper. The information processing apparatus 10 calculates the metallic values and color values from the received colorimetric values. Then, the process proceeds to step S13.

In step S13, the information processing apparatus 10 sorts the sorting target paper into groups (for example, group A and group B) based on the glossiness or the smoothness of the sorting target paper. Then, the process proceeds to step S14.

In step S14, the information processing apparatus 10 determines whether all sorting target paper are sorted. In the case all sorting target paper are sorted into groups (step S14: YES), the process proceeds to step S15, and in the case not all sorting target paper are sorted (step S14: NO), the process returns to step S13.

In step S15, the information processing apparatus 10 selects a representative paper from among the sorting target paper sorted into the same group. For example, the information processing apparatus 10 selects, among the sorting target paper sorted into the same group, printing paper with a high distribution frequency or printing paper whose surface characteristic (glossiness or smoothness) is positioned roughly in the center of the group as the representative paper. Then, the process proceeds to step S16.

In step S16, the information processing apparatus 10 derives five-color device value based on the metallic values and color values corresponding to the selected representative paper. Then, the process proceeds to step S17.

In step S17, the information processing apparatus 10 creates and stores a color conversion dictionary corresponding to each representative paper based on the derived five-color device value. Then, the process proceeds to step S18.

In step S18, in response to receiving a request for print job from the user, the controller 20 selects printing paper according to the user's operation of the keyboard 611 or mouse 612 through a user interface (UI) screen displayed on the display device 25. Then, the process proceeds to step S19.

In step S19, based on the glossiness or smoothness of the selected printing paper and the glossiness or smoothness of each representative paper stored in the information processing apparatus 10, the controller 20 sorts a color conversion dictionary corresponding to each representative paper, which involves all color conversion dictionaries. Then, the process proceeds to step S20.

In step S20, the controller 20 initializes an index variable i to 1 and a variable a to the total number of color conversion dictionaries used in internal processing in order to present information about the sorted color conversion dictionaries in order. Then, the process proceeds to step S20a.

In step S20a, the controller 20 determines whether the index variable i is equal to or less than the variable a (the number of all color conversion dictionaries), and in the case the index variable i is equal to or less than the variable a, executes steps S21 to S24, and in the case the index variable i exceeds the variable a, the process proceeds to step S25. In step S21, the controller 20 presents information regarding the i-th color conversion dictionary on the display device 25. Then, the process proceeds to step S22.

In step S22, the user operates the keyboard 611 or the mouse 612 to indicate whether to accept or refuse the color conversion dictionary presented on the display device 25. Then, the controller 20 acquires a determination result for the color conversion dictionary by the user. Then, the process proceeds to step S23.

In step S23, in the case the determination result obtained by the controller 20 indicates acceptance (step S23: YES), the process proceeds to step S25, and in the case the determination result indicates refusal (step S23: NO), the process proceeds to step S24.

In step S24, the controller 20 increments index variable i, and the process proceeds to step S20b. In step S20b, the controller 20 determines whether the index variable i is equal to or less than the variable a (the number of all color conversion dictionaries), and in the case the index variable i is equal to or less than the variable a, executes steps S21 to S24, and in the case the index variable i exceeds the variable a, the process proceeds to step S25. As a result, the color conversion dictionary next to the presented color conversion dictionary is presented.

Based on the acceptance by the user of the presented color conversion dictionary in step S23, the controller 20 determines the color conversion dictionary to be used for color conversion of the print job in step S25. In the case all the presented color conversion dictionaries are refused by the user in step S23, the controller 20 terminates the operation, for example, without executing the print job. In this case, the controller 20 may forcibly determine the first color conversion dictionary among the sorted color conversion dictionaries as the color conversion dictionary to be used for color conversion of the print job. Then, the process proceeds to step S26.

In step S26, the controller 20 uses the determined color conversion dictionary to perform color conversion processing for converting the spot colors designated in the received print job into five-color device value. Then, the process proceeds to step S27.

In step S27, the controller 20 transmits the image data obtained by the color conversion process to the image forming apparatus 30. Then, the process proceeds to step S28.

In step S28, the image forming apparatus 30 prints the image data received from the controller 20.

The entire operation of the information processing system 1 is performed by the process of steps S11 to S28 described above.

Figure 9:
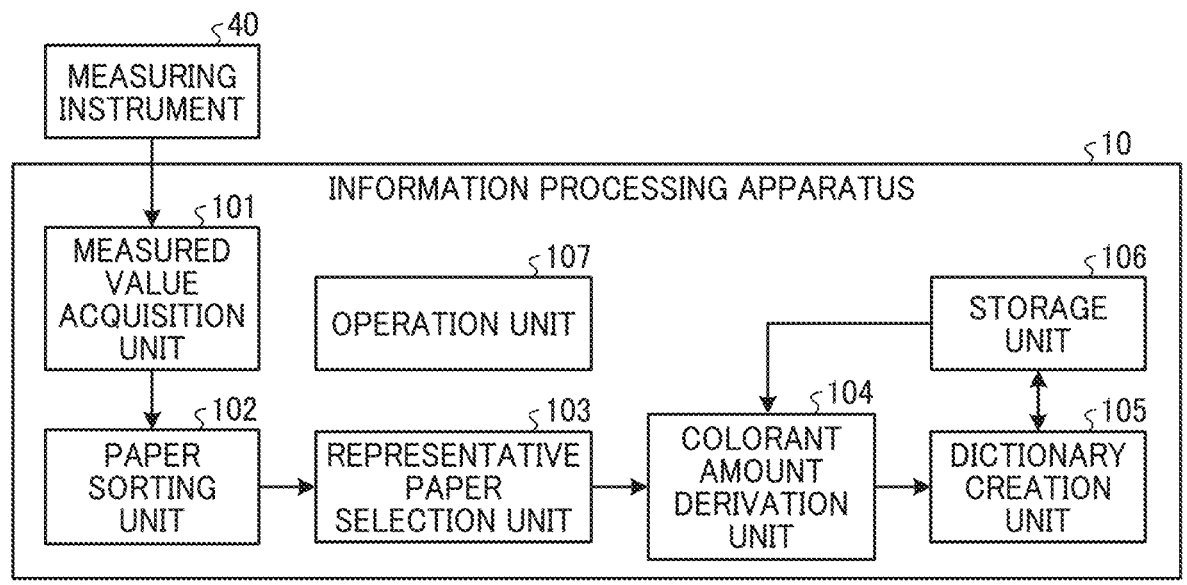
FIG. 9 is a block diagram illustrating an example of a functional configuration of the information processing apparatus according to the first embodiment.
Figure 10:
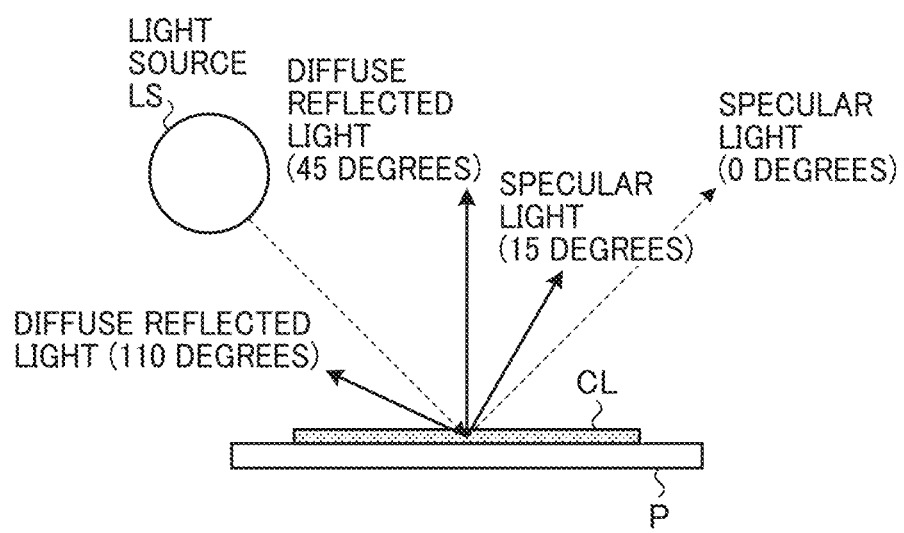
FIG. 10 is a diagram illustrating a colorimetric operation of a colorimeter according to the first embodiment.
Figure 11:
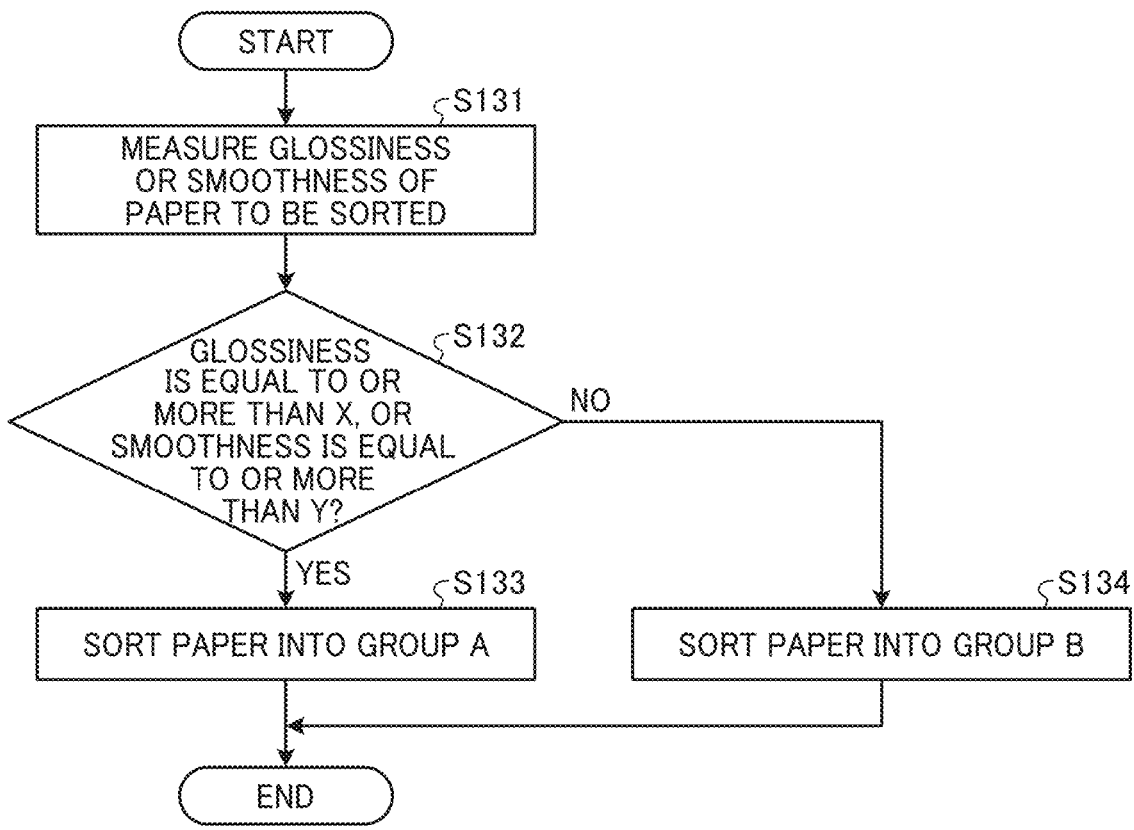
FIG. 11 is a flowchart illustrating an example of an operation of a paper sorting unit of the information processing apparatus according to the first embodiment.

FIG. 9 is a block diagram illustrating an example of a functional configuration of the information processing apparatus according to the first embodiment. FIG. 10 is a diagram illustrating a colorimetric operation of a colorimeter according to the first embodiment. FIG. 11 is a flowchart illustrating an example of an operation of a paper sorting unit of the information processing apparatus according to the first embodiment. The functional configuration and operation of the information processing apparatus 10 according to the present embodiment is described with reference to FIGS. 9 to 11.

As illustrated in FIG. 9, the information processing apparatus 10 includes a measured value acquisition unit 101 (third acquisition unit), the paper sorting unit 102 (sorting unit), a representative paper selection unit 103 (third selection unit), a colorant amount derivation unit 104, a dictionary creation unit 105 (creation unit), a storage unit 106, and an operation unit 107. These functional units are implemented by the CPU 601 according to a program stored in any desired memory.

The measured value acquisition unit 101 is a functional unit that acquires the glossiness and smoothness of the printing paper measured by the measuring instrument 40 through the network I/F 609 and sends the glossiness and smoothness of the printing paper to the paper sorting unit 102. Further, the measured value acquisition unit 101 acquires, through the network I/F 609, the colorimetry value of the target color printed portion (patch) of the printing paper measured by the measuring instrument 40.

With reference to FIG. 10, details of the colorimetric operation by the measuring instrument 40 is described in the following.

In the colorimetric processing, the measuring instrument 40 acquires a colorimetric value in the direction of 15 degrees, colorimetric value in the direction of 45 degrees, which is diffusely reflected light, and colorimetric value in the direction of 110 degrees, which is the same diffuse reflected light, when the direction of specularly reflected light when the light emitted from the light source LS in an oblique direction (a direction at 45 degrees to the normal line) is reflected by the colorant layer CL formed on the printing paper P (an example of the recording medium) is 0 degrees. Specifically, these colorimetric values are values based on spectral reflectance in each direction.

Specifically, the measured value acquisition unit 101 acquires the colorimetric values in the directions of 15 degrees, 45 degrees, and 110 degrees measured by the measuring instrument 40 with respect to the patch of the target color as described above. The measured value acquisition unit 101 calculates a metallic value and a color value, which are two physical quantities (evaluation values), from a plurality of acquired colorimetric values. In the present embodiment, for example, the metallic value is described as a flop index generally used as a method of measuring color with optical anisotropy.

As illustrated in FIG. 10, the flop index is calculated by the following formula (1) in which the difference between the L value of 15 degrees and the L value of 110 degrees is normalized by the L value of 45 degrees, using L value out of Lab values measured in directions of 15 degrees, 45 degrees, and 110 degrees when the direction of specularly reflected light of light emitted from the light source (LS) from a direction of 45 degrees with respect to the normal line is assumed to be 0 degrees.

$$F\cdot I = 2.69(L^*_{15} - L^*_{110})^{1.11}/(L^*_{45})^{0.85} \quad (1)$$

In the above formula (1), F. I is the flop index, $L^*_{15}$ is the L value in the 15 degree direction, $L^*_{45}$ is the L value in the 45 degree direction, and $L^*_{110}$ is the L value in the 110 degree direction. The flop index F. I is a physical quantity that gives a higher brilliance (metallicity) as the value increases. On the other hand, the color value is assumed to be a Lab value representing saturation and density in the 45-degree direction, which are conventional indices. The metallic value is not limited to the flop index, and may be replaced by another index value or evaluation value.

The measured value acquisition unit 101 stores the calculated metallic value and color value in the storage unit 106 in association with the printing paper on which the colorimetry is performed.

The paper sorting unit 102 is a functional unit that sorts the measured printing paper into groups based on the glossiness or smoothness acquired by the measured value acquisition unit 101. With reference to FIG. 11, details of a colorimetric operation by the paper sorting unit 102 are described. The sorting operation by the paper sorting unit 102 illustrated in FIG. 11 corresponds to the process of step S13 in FIG. 8 described above.

In step S131, the paper sorting unit 102 acquires the glossiness or smoothness of the sorting target paper acquired by the measured value acquisition unit 101. Then, the process proceeds to step S132.

In step S132, the paper sorting unit 102 determines whether the acquired glossiness is equal to or more than a predetermined value X, or whether the acquired smoothness is equal to or more than a predetermined value Y. Based on determination that the glossiness is equal to or more than the predetermined value X, or the smoothness is equal to or more than the predetermined value Y (step S132: YES), the process proceeds to step S133. Based on determination that the glossiness is less than the predetermined value X or the smoothness is less than the predetermined value Y (step S132: NO), the process proceeds to step S134.

In step S133, the paper sorting unit 102 sorts the sorting target paper into group A.

In step S134, the paper sorting unit 102 sorts the sorting target paper into group B.

The sorting operation by the paper sorting unit 102 is performed according to steps S131 to S134 described above.

The representative paper selection unit 103 is a functional unit that selects the representative paper from the sorting target paper for each group sorted by the paper sorting unit 102.

The colorant amount derivation unit 104 reads the metallic value and the color value corresponding to the representative paper selected by the representative paper selection unit 103 from the storage unit 106, and derives five-color device value for reproducing the target color based on the metallic value and color value. The colorant amount derivation unit 104 sends the derived five-color device value to dictionary creation unit 105. Details of the configuration and operation of the colorant amount derivation unit 104 are described below.

The dictionary creation unit 105 is a functional unit that reads target color information from the storage unit 106 (target color used as a basis for the colorimetric values acquired by the measured value acquisition unit 101), and creates the color conversion dictionary that associates the target color with the five-color device value derived by the colorant amount derivation unit 104 and stores the color conversion dictionary in the storage unit 106. The dictionary creation unit 105 stores the created color conversion dictionary in the storage unit 106 in association with the glossiness or smoothness of the representative paper.

The storage unit 106 is a functional unit that stores the color conversion dictionary corresponding to the representative paper created by the dictionary creation unit 105, glossiness or smoothness, metallic value and color value of the sorting target paper, target color information (target color name and Lab value etc.), color prediction models (metallic value prediction model and color value prediction model), and the like. The storage unit 106 is implemented by the auxiliary storage device 605 illustrated in FIG. 6.

The operation unit 107 is a functional unit that receives an operational input by a user. The operation unit 107 may receive the operation for the measuring instrument 40 in addition to the operation for the information processing apparatus 10. The operation unit 107 is implemented by the keyboard 611 and the mouse 612 illustrated in FIG. 6.

The measured value acquisition unit 101, the paper sorting unit 102, the representative paper selection unit 103, the colorant amount derivation unit 104, and the dictionary creation unit 105 described above are implemented by executing programs by the CPU 601 illustrated in FIG. 6. At least some of the functional units of the information processing apparatus 10 illustrated in FIG. 9 may be implemented by a hardware circuit such as a field-programmable gate array (FPGA) or an application specific integrated circuit (ASIC).

Further, each functional unit of the information processing apparatus 10 illustrated in FIG. 9 conceptually illustrates a function and is not limited to such a configuration. For example, a plurality of functional units illustrated as independent functional units in the information processing apparatus 10 illustrated in FIG. 9 may be configured as one functional unit. On the other hand, in the information processing apparatus 10 illustrated in FIG. 9, function of one functional unit may be divided into a plurality of units to be configured as a plurality of functional units.

Figure 12:
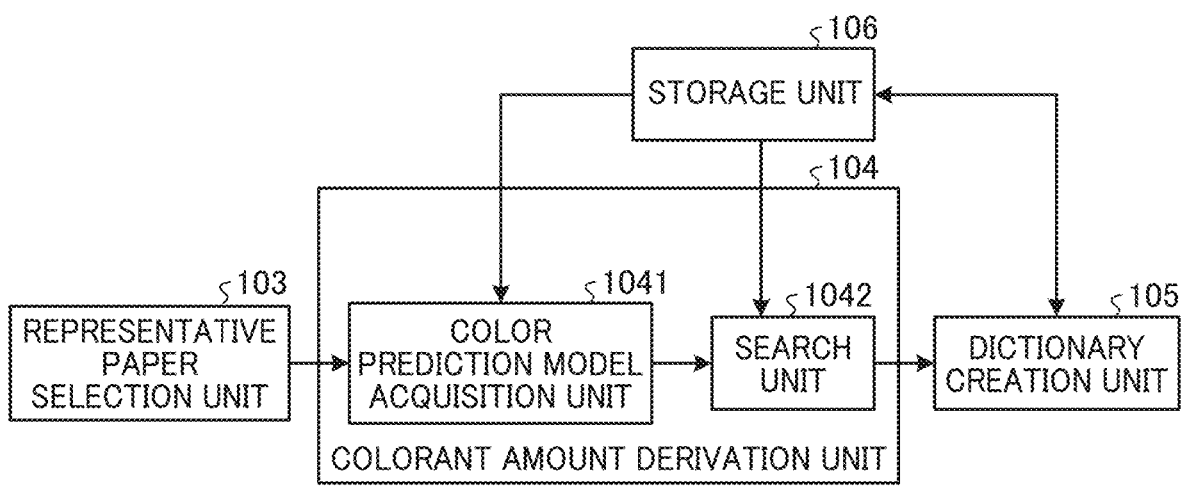
FIG. 12 is a block diagram illustrating an example of a functional configuration of a colorant amount derivation unit of the information processing apparatus according to the first embodiment.
Figure 13:
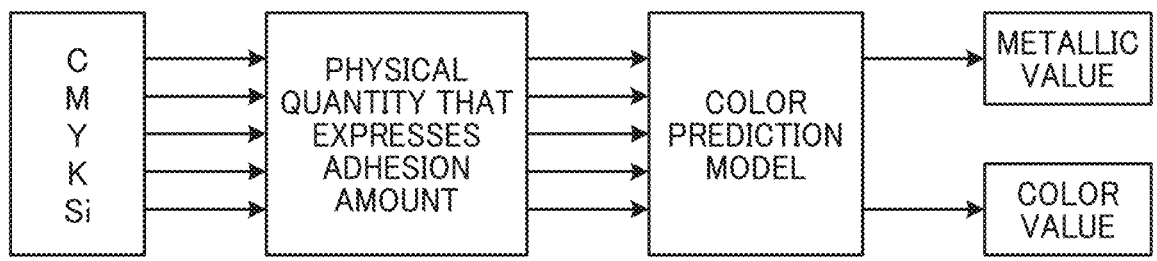
FIG. 13 is a diagram illustrating a color prediction model.
Figure 14:
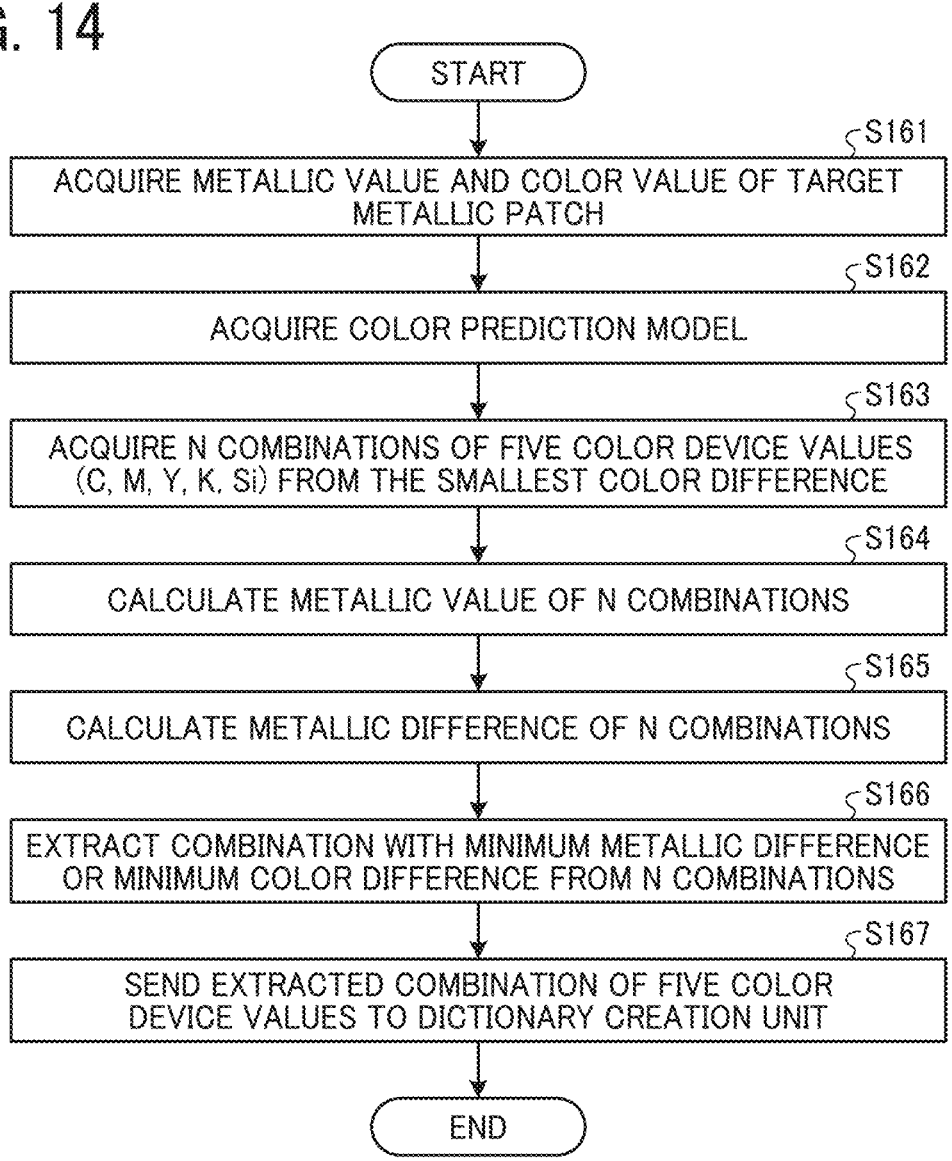
FIG. 14 is a flowchart illustrating an example of an operation of a search unit of the colorant amount derivation unit of the information processing apparatus according to the first embodiment.

FIG. 12 is a block diagram illustrating an example of a functional configuration of a colorant amount derivation unit of the information processing apparatus according to the first embodiment. FIG. 13 is a diagram illustrating the color prediction model. FIG. 14 is a flowchart illustrating an example of an operation of a search unit of the colorant amount derivation unit of the information processing apparatus according to the first embodiment. The functional configuration and operation of the colorant amount derivation unit 104 of the information processing apparatus 10 according to the present embodiment is described with reference to FIGS. 12 to 14.

As illustrated in FIG. 12, the colorant amount derivation unit 104 of the information processing apparatus 10 includes a color prediction model acquisition unit 1041 and a search unit 1042.

The color prediction model acquisition unit 1041 is a functional unit that acquires representative paper information (including glossiness or smoothness) from the representative paper selection unit 103, acquires the color prediction models (the metallic value prediction model and the color value prediction model) corresponding to the representative paper from the storage unit 106 and sends the acquired information to the search unit 1042.

FIG. 13 illustrates the contents of processing of the color prediction model. The color prediction model outputs the metallic value and the color value of the metallic color expected to be reproduced by the image forming apparatus 30 by inputting the physical quantity representing an adhesion amount for the five-color device value (C, M, Y, K, Si). Among the color prediction models, a model that outputs a metallic value of a metallic color that is predicted to be reproduced from a physical quantity that indicates the adhesion amount of the five-color device value is called the metallic value prediction model and a model that outputs a color value of a metallic color that is predicted to be reproduced from a physical quantity that indicates the adhesion amount of five-color device value is called the color value prediction model. According to the present embodiment, the metallic value prediction model outputs the flop index represented by the above formula (1) as the metallic value, and the color value prediction model outputs the Lab value representing saturation and density in the 45-degree direction as the color value.

A method for creating the color prediction model is described. First, the image forming apparatus 30 prints the color patches of various combinations of five-color device values. Then, for each color patch, as illustrated in FIG. 10, colorimetric values measured in a plurality of directions by the measuring instrument 40 are obtained. The result is a metallic value and a color value for each color patch. Based on these values, the metallic value prediction model for acquiring the metallic value and the color value prediction model for acquiring the color value are created by inputting the five-color device value. As functions used for these color prediction models, general functions for color prediction models such as multiple regression equations, neural networks, and interpolation using direct lookup tables can be used. The created color prediction model is stored in the storage unit 106.

The search unit 1042 is a functional unit that reads from the storage unit 106, the metallic values and color values calculated by the measured value acquisition unit 101 and stored in the storage unit 106, which are associated with the representative paper selected by the representative paper selection unit 103 as described above, and uses the color prediction model received from the color prediction model acquisition unit 1041 to derive the five-color device value and sends the five-color device value to the dictionary creation unit 105. With reference to FIG. 14, a derivation operation of the five-color device value by the search unit 1042 is described. The operation of deriving the five-color device value by the search unit 1042 illustrated in FIG. 14 corresponds to step S16 in FIG. 8 described above.

In step S161, among the metallic value and the color value of the patch of the target color (metallic patch) calculated by the measured value acquisition unit 101 and stored in the storage unit 106, the search unit 1042 reads those associated with the representative paper selected by the representative paper selection unit 103 from the storage unit 106 and acquires as the metallic value Sof and the color value Eof. Then, the process proceeds to step S162.

In step S162, the search unit 1042 acquires the color prediction model (the metallic value prediction model and the color value prediction model) from the color prediction model acquisition unit 1041. Then, the process proceeds to step S163.

In step S163, the search unit 1042 obtains N combinations of the five-color device values (C, M, Y, K, Si) in descending order of color difference from the color value Eof of the target color using the color value prediction model. As a result, the search unit 1042 obtains N color differences $\Delta Erep\_1$, $\Delta Erep\_2$, to $\Delta Erep\_N$. The reason for acquiring the N combinations of the five-color device values based on the color difference of the color value is that in the case the five-color device values are obtained based on the metallic difference of the metallic value, the reproducibility of the target color may be greatly impaired. Then, the process proceeds to step S164.

In step S164, the search unit 1042 calculates N metallic values $Srep\_1$, $Srep\_2$, to $Srep\_N$ from the N combinations of the five-color device values using the metallic value prediction model. Then, the process proceeds to step S165.

In step S165, the search unit 1042 calculates N metallic differences $\Delta Srep\_1$, $\Delta Srep\_2$, to $\Delta Srep\_N$ that are the difference between the metallic value Sof of the target color and the N metallic values $Srep\_1$, $Srep\_2$, to $Srep\_N$. Then, the process proceeds to step S166.

In step S166, the search unit 1042 extracts a combination of five-color device values corresponding to the minimum color difference among the color differences corresponding to the N combinations of five-color device values, in the case there is no metallic difference equal to or less than the allowable value ΔStol, among the N metallic differences corresponding to N combinations of the five-color device values, ΔSrep_1, ΔSrep_2, to ΔSrep_N. Then, the process proceeds to step S167.

In step S167, the search unit 1042 sends the extracted (derived) five-color device values to the dictionary creation unit 105 together with the glossiness or smoothness of the representative paper.

The processing of the search unit 1042 is executed according to steps S161 to S167 described above.

In the information processing apparatus 10 described above, the measured value acquisition unit 101 calculates two physical quantities, the metallic value and the color value, from the colorimetric values, but the present disclosure is not limited to this example. For example, the measured value acquisition unit 101 may calculate two or more physical quantities including the metallic value and the color value from the colorimetric values as evaluation values. In this case, the search unit 1042 derives the five-color device value based on each physical quantity.

FIGS. 15A, 15B, and 15C are tables illustrating examples of color conversion dictionaries. The operation of the dictionary creation unit 105 of the information processing apparatus 10 according to the present embodiment is described with reference to FIGS. 15A, 15B, and 15C.

First, among the metallic and color values of the target color patch (metallic patch) calculated by the measured value acquisition unit 101 and stored in the storage unit 106, the dictionary creation unit 105 reads the information of the target color patch associated with the representative paper selected by the representative paper selection unit 103. The information is, for example, a color name. Then, the dictionary creation unit 105 creates the color conversion dictionary by associating the five-color device value calculated by the search unit 1042 with the read target color information (color name).

FIG. 15A illustrates an example of a color conversion dictionary that associates color names with Lab values. FIGS. 15B and 15C illustrates examples of the color conversion dictionaries in which color names are associated with the five-color device value of CMYKSi. The dictionary created by the dictionary creation unit 105 of the information processing apparatus 10 according to the present embodiment is the color conversion dictionary associating the five-color device value obtained by adding Si (metallic silver) to the four-color device value and the color name as illustrated in FIGS. 15B and 15C. The dictionary creation unit 105 stores the created color conversion dictionary in the storage unit 106 in association with the glossiness or smoothness of the representative paper.

Figure 16:
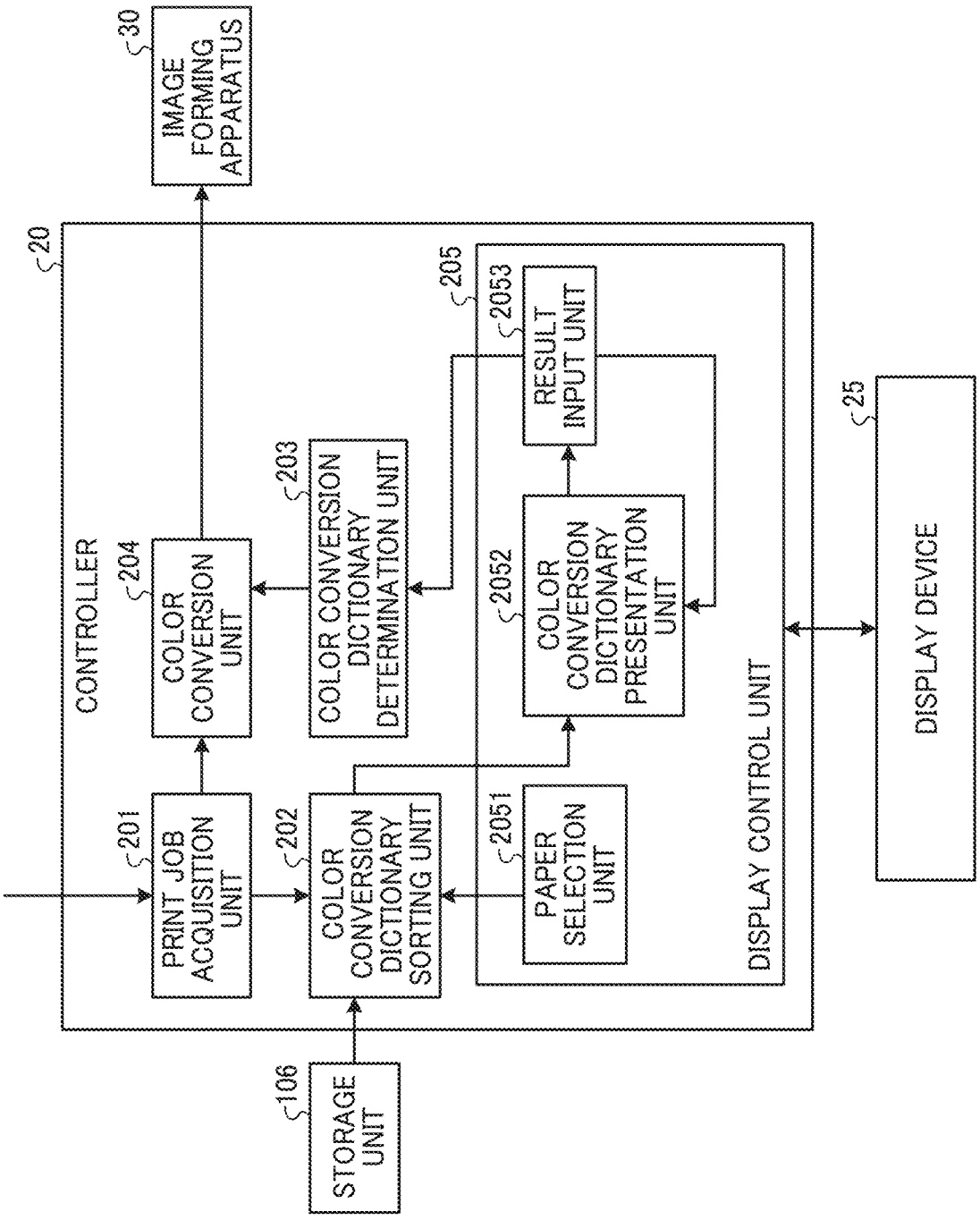
FIG. 16 is a block diagram illustrating an example of a functional configuration of a controller according to the first embodiment.
Figure 17:
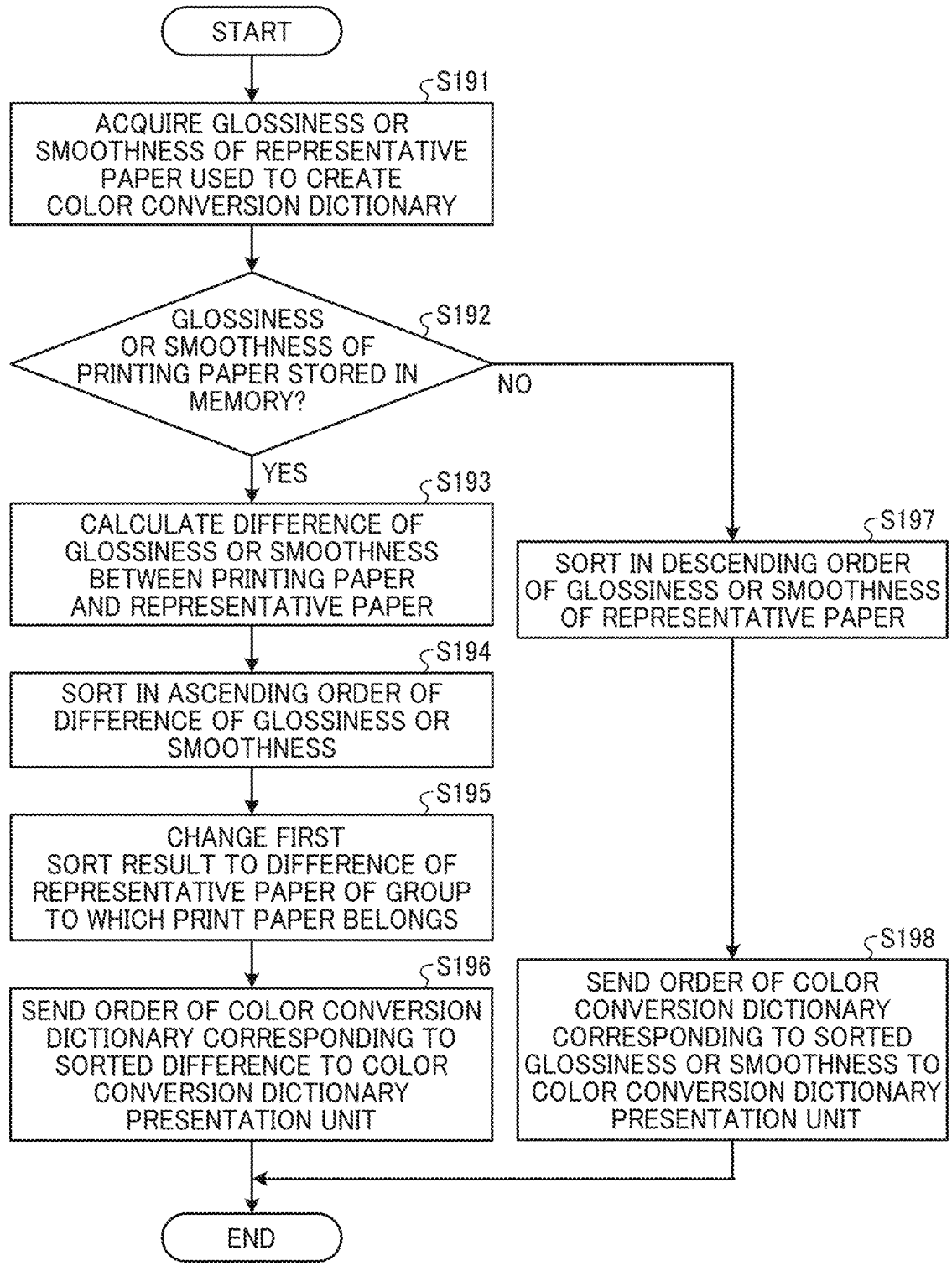
FIG. 17 is a flowchart illustrating an example of an operation of a color conversion dictionary sorting unit of the controller according to the first embodiment.
Figure 18:
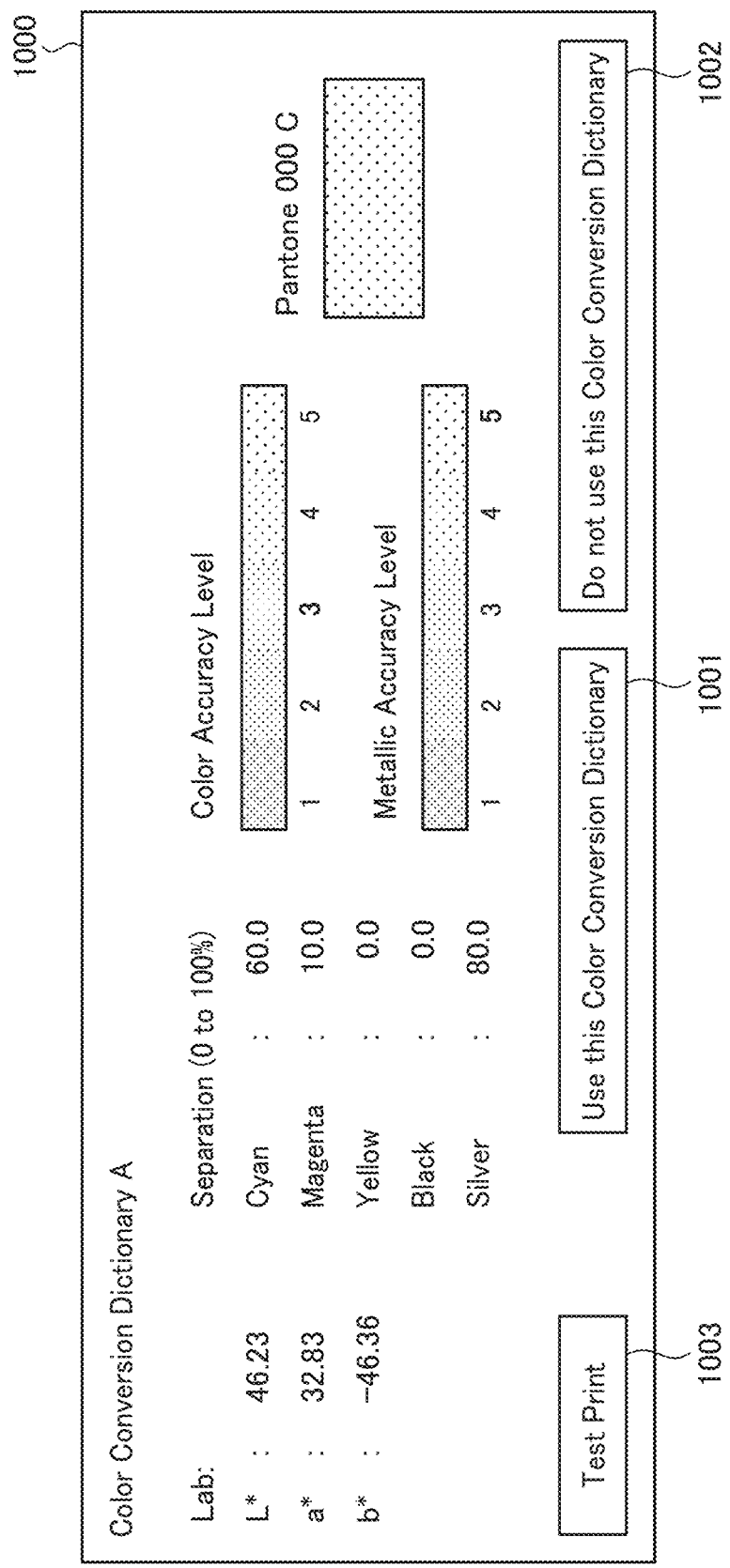
FIG. 18 is a diagram illustrating an example of a presentation screen displayed by a display device according to the first embodiment.

FIG. 16 is a block diagram illustrating an example of a functional configuration of the controller according to the first embodiment. FIG. 17 is a flowchart illustrating an example of an operation of a color conversion dictionary sorting unit of the controller according to the first embodiment. FIG. 18 is a diagram illustrating an example of a presentation screen displayed by the display device according to the first embodiment. The functional configuration and operation of the controller 20 according to the present embodiment is described with reference to FIGS. 16 to 18.

As illustrated in FIG. 16, the controller 20 includes a print job acquisition unit 201 (first acquisition unit), the color conversion dictionary sorting unit 202 (second acquisition unit), a color conversion dictionary determination unit 203, a color conversion unit 204, and a display control unit 205.

The print job acquisition unit 201 is a functional unit that acquires a print job from the outside (for example, the information processing apparatus 10 or the like) and sends the print job to the color conversion dictionary sorting unit 202 and the color conversion unit 204. The print job includes spot color information (special color information).

The color conversion dictionary sorting unit 202 is a functional unit that reads the glossiness or smoothness associated with the color conversion dictionary of the representative paper from the storage unit 106, and sorts the color conversion dictionary based on the glossiness or smoothness and information on the printing paper selected by a paper selection unit 2051 of the display control unit 205, which is described below. The color conversion dictionary sorting unit 202 also sends the sorted color conversion dictionaries and the print job spot color information received from the print job acquisition unit 201 to a color conversion dictionary presentation unit 2052 of the display control unit 205, which is described below. With reference to FIG. 17, a sorting operation by the color conversion dictionary sorting unit 202 is described in the following. The sorting operation by the color conversion dictionary sorting unit 202 illustrated in FIG. 17 corresponds to step S19 in FIG. 8.

In step S191, the color conversion dictionary sorting unit 202 reads from the storage unit 106 the glossiness or smoothness of each representative paper used to create respective color conversion dictionary. Then, the process proceeds to step S192.

In step S192, the color conversion dictionary sorting unit 202 confirms whether the glossiness or smoothness of the printing paper selected by the paper selection unit 2051 of the display control unit 205 described below is stored in the storage unit 106. In the case the glossiness or smoothness of the printing paper is stored in the storage unit 106 (step S192: YES), the process proceeds to step S193, and in the case the glossiness or smoothness of the printing paper is not stored (step S192: NO), the process proceeds to step S197.

In step S193, in the case the glossiness or smoothness of the printing paper is stored in the storage unit 106, the color conversion dictionary sorting unit 202 calculates a glossiness or smoothness difference value between the printing paper selected by the paper selection unit 2051 and the representative paper corresponding to each color conversion dictionary. Then, the process proceeds to step S194.

In step S194, the color conversion dictionary sorting unit 202 sorts the calculated glossiness or smoothness difference values in ascending order. Then, the process proceeds to step S195.

In step S195, the color conversion dictionary sorting unit 202 changes the first sort result to the difference value of the representative paper of the group to which the printing paper selected by the paper selection unit 2051 belongs. As a result, the color conversion dictionary of the representative paper of the group to which the selected printing paper belongs is presented. Then, the process proceeds to step S196.

In step S196, the color conversion dictionary sorting unit 202 sends the color conversion dictionary information arranged in the order of the sorted difference values and the spot color information to the color conversion dictionary presenting unit 2052 of the display control unit 205, which is described below. Then, the sorting operation of the color conversion dictionary sorting unit 202 ends.

In step S197, in the case the glossiness or smoothness of the printing paper is not stored in the storage unit 106, the color conversion dictionary sorting unit 202 sorts the representative paper in descending order of glossiness or smoothness. Then, the process proceeds to step S198.

In step S198, the color conversion dictionary sorting unit 202 sends the color conversion dictionary information arranged in the order of glossiness or smoothness of the sorted representative paper and the spot color information to the color conversion dictionary presenting unit 2052 of the display control unit 205, which is described below. Then, the sorting operation of the color conversion dictionary sorting unit 202 ends.

The processing of the color conversion dictionary sorting unit 202 is executed by steps S191 to S198 described above.

The color conversion dictionary determination unit 203 is a functional unit that determines a color conversion dictionary to be used based on an operational input by the user received by the result input unit 2053. The color conversion dictionary determination unit 203 sends the determined color conversion dictionary to color conversion unit 204. The color conversion dictionary determination unit 203 may acquire the determined color conversion dictionary from the storage unit 106 through the color conversion dictionary sorting unit 202 based on the operational input by the user received by the result input unit 2053.

The color conversion unit 204 is a functional unit that uses the color conversion dictionary indicated by the information received from the color conversion dictionary determination unit 203 and performs color conversion processing for converting spot colors (an example of color information) designated in the print job received from the print job acquisition unit 201 into the five-color device value. The color conversion unit 204 transmits the image data obtained by the color conversion processing to the image forming apparatus 30.

The display control unit 205 is a functional unit that performs display control of the display device 25 and the like. The display control unit 205 includes, as illustrated in FIG. 16, a paper selection unit 2051 (first selection unit), a color conversion dictionary presentation unit 2052 (presentation unit), and a result input unit 2053 (input unit).

The paper selection unit 2051 is a functional unit that causes the display device 25 to display a screen that allows the user to input which print paper to select. The paper selection unit 2051 sends information on the printing paper selected by operation through the keyboard 611 and mouse 612 (examples of operation devices) of the controller 20 to the color conversion dictionary sorting unit 202.

The color conversion dictionary presentation unit 2052 is a functional unit that causes the display device 25 to display a presentation screen that presents the information of the print conversion dictionary and the spot color information in the sorted order, based on the sorted print conversion dictionary information acquired by the color conversion dictionary sorting unit 202 and the spot color information. FIG. 18 illustrates a presentation screen 1000 as an example of a presentation screen displayed by the color conversion dictionary presentation unit 2052.

As illustrated in FIG. 18, the presentation screen 1000 includes, the color name of the spot color information, the Lab value corresponding to the spot color information, and as the information of the color conversion dictionary, the name of the color conversion dictionary and the spot color information, the five-color device value converted by the color conversion dictionary, information indicating accuracy of color values and accuracy of metallic values based on the color conversion dictionary ("color accuracy level" and "metallic accuracy level" illustrated in FIG. 18), and the predicted color when the color conversion is performed by the color conversion dictionary. The accuracy of the color value and the accuracy of the metallic value are displayed in, for example, a five-level evaluation, as illustrated in FIG. 18. In addition, the presentation screen 1000 includes a permit button 1001, a reject button 1002, and a test print button 1003, as illustrated in FIG. 18.

The permit button 1001 is a button to be pressed to use the color conversion dictionary displayed on the presentation screen 1000. By pressing the permit button 1001, permission is selected for the color conversion dictionary in step S22 of FIG. 8 described above.

The reject button 1002 is a button to be pressed to reject to use the color conversion dictionary displayed on the presentation screen 1000. By pressing the reject button 1002, a rejection of the color conversion dictionary is selected in step S22 of FIG. 8 described above.

The test print button 1003 is a button to be pressed to execute a test print by the image forming apparatus 30 using the color conversion dictionary displayed on the presentation screen 1000, and with the five-color device value converted to reproduce the spot color indicated by the displayed spot color information. This allows the user to confirm the color and metallicity.

The result input unit 2053 is a functional unit that receives the operational input by the user regarding the result of permission or rejection as to whether the color conversion dictionary is permitted by pressing the permit button 1001 or whether the color conversion dictionary is rejected by pressing the reject button 1002 on the presentation screen 1000 displayed on the display device 25. The result input unit 2053 sends the result of permission or rejection to the color conversion dictionary determination unit 203 and the color conversion dictionary presentation unit 2052. In response to receiving the result indicating rejection from the result input unit 2053, the color conversion dictionary presentation unit 2052 displays the presentation content of the next color conversion dictionary on the presentation screen 1000 in accordance with the order sorted by the color conversion dictionary sorting unit 202.

The above-described print job acquisition unit 201, the color conversion dictionary sorting unit 202, the color conversion dictionary determination unit 203, the color conversion unit 204, and the display control unit 205 are implemented by executing programs by the CPU 601 illustrated in FIG. 6. At least a part of the functional units of the controller 20 illustrated in FIG. 16 implemented by software (programs) may be implemented by hardware circuits such as the FPGA or ASIC.

Further, each functional unit of the controller 20 illustrated in FIG. 16 conceptually illustrates a function and is not limited to such configuration. For example, a plurality of functional units illustrated as independent functional units in the controller 20 illustrated in FIG. 16 may be configured as one functional unit.

On the other hand, in the controller 20 illustrated in FIG. 16, a function of one functional unit may be divided into a plurality of units to be configured as a plurality of functional units.

As described above, in the controller 20 of the information processing system 1 according to the present embodiment, the print job acquisition unit 201 acquires the print job, the paper selection unit 2051 selects the printing paper according to the user's operation on the keyboard 611 or the mouse 612, the color conversion dictionary sorting unit 202 acquires the color conversion dictionary based on the physical property of the printing paper selected by the paper selection unit 2051 from among the color conversion dictionaries corresponding to the respective representative paper sorted into a plurality of groups, the color conversion dictionary presentation unit 2052 presents the information of the color conversion dictionary acquired by the color conversion dictionary sorting unit 202 through the display device 25, the result input unit 2053 receives the operational input indicating whether to permit or to reject the presented color conversion dictionary through the keyboard 611 or mouse 612, and the color conversion unit 204 uses the color conversion dictionary permitted by the operational input received by the result input unit 2053 to color-convert the spot colors of the print job. As a result, without increasing the number of color conversion dictionaries for new printing paper, high-quality color reproduction can be achieved by using color conversion dictionaries that achieve image quality that meets the user's request.

Further, in the controller 20 of the information processing system 1 according to the present embodiment, the color conversion dictionary sorting unit 202 calculates the difference value between the value indicating the physical property of the printing paper selected by the paper selection unit 2051 and the value indicating the physical property of each representative paper, sorts based on the calculated difference value, and places the difference value corresponding to the representative paper of the group to which the printing paper belongs at the first of the sorted difference values, the color conversion dictionary presentation unit 2052 presents through the display device 25 the information of the color conversion dictionary corresponding to the first difference value among the sorted difference values, and in the case the presented color conversion dictionary is rejected based on the operational input received by the result input unit 2053, present the information of the color conversion dictionary corresponding to the difference value next to the difference value of the presented color conversion dictionary. As a result, even when the user does not want to use the displayed color conversion dictionary, the color conversion dictionary to be used instead is presented, thereby improving operability and facilitating the selection of the color conversion dictionary according to the user's choice.

The information processing system 1 according to a second embodiment is described, focusing on points that are different from the information processing system 1 according to the first embodiment. In the present embodiment, an operation of selecting a plurality of candidates from the first of the sorted color conversion dictionary and presenting the candidates collectively is described. The overall configuration of the information processing system 1 according to the present embodiment, the hardware configuration of the information processing apparatus 10, the controller, and the image forming apparatus 30, and the functional configuration of the information processing apparatus 10 are the same as those of the first embodiment.

Figure 19:
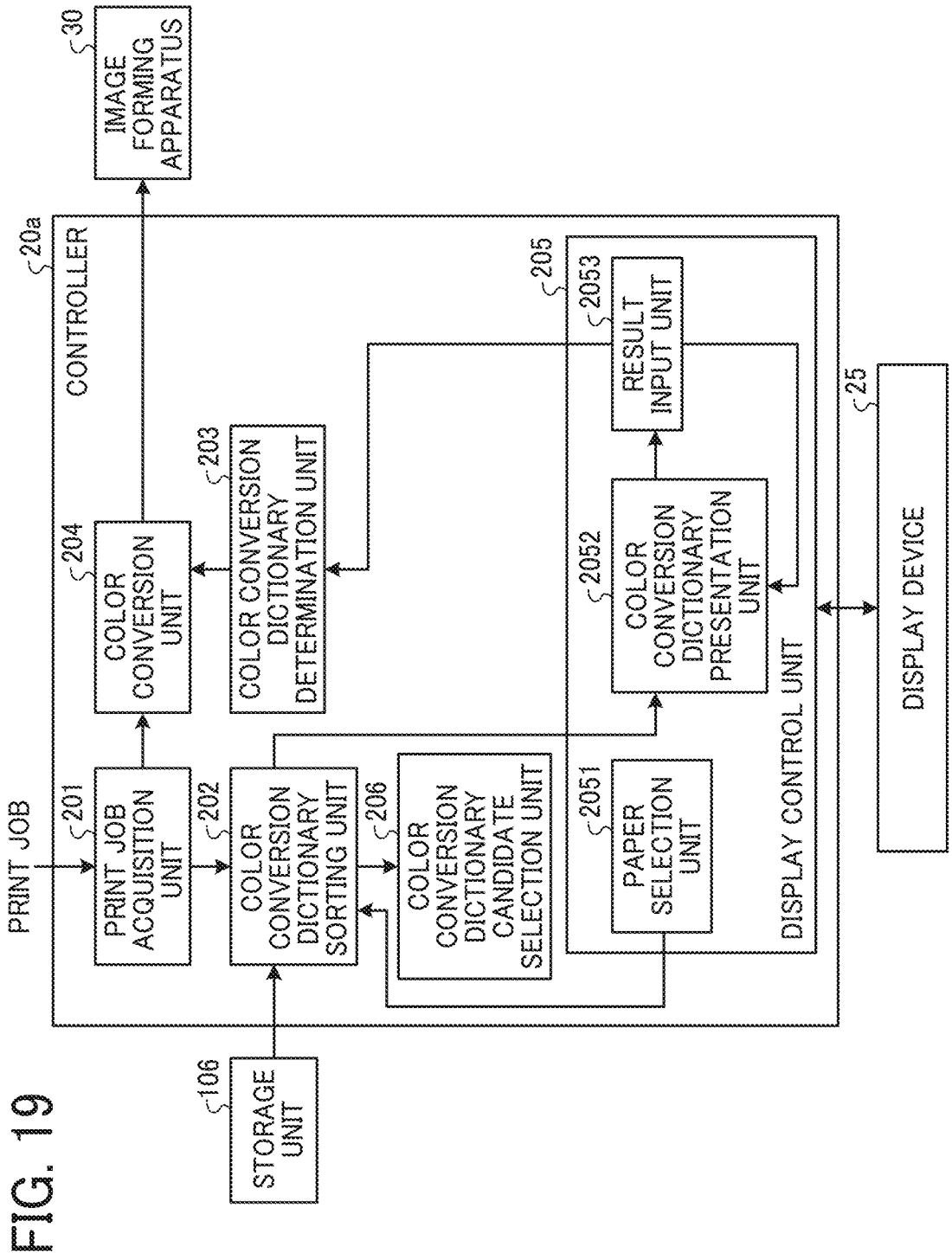
FIG. 19 is a block diagram illustrating an example of a functional configuration of a controller according to a second embodiment.
Figure 20:
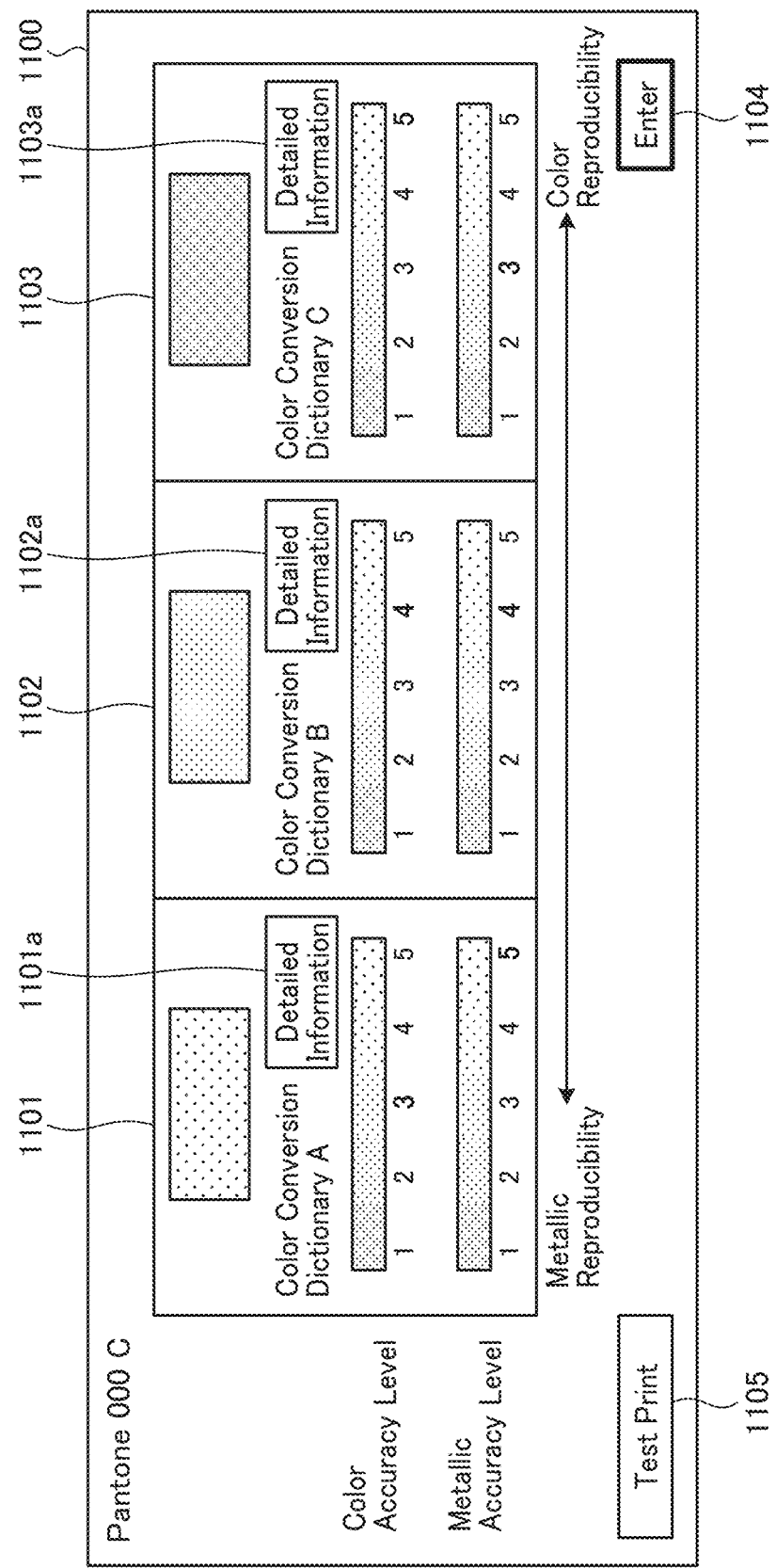
FIG. 20 is a diagram illustrating an example of the presentation screen displayed by the display device according to the second embodiment.

FIG. 19 is a block diagram illustrating an example of the functional configuration of the controller according to the second embodiment. FIG. 20 is a diagram illustrating an example of the presentation screen displayed by the display device according to the second embodiment. The configuration and operation of the functional blocks of a controller 20a according to the present embodiment is described with reference to FIGS. 19 and 20.

The information processing system 1 according to the present embodiment includes the controller 20a illustrated in FIG. 19 instead of the controller 20 included in the information processing system 1 according to the first embodiment. As illustrated in FIG. 19, the controller 20a includes the print job acquisition unit 201 (first acquisition unit), the color conversion dictionary sorting unit 202 (second acquisition unit), the color conversion dictionary determination unit 203, the color conversion unit 204, the display control unit 205, and a color conversion dictionary candidate selection unit 206 (second selection unit). The functions of the print job acquisition unit 201, the color conversion dictionary sorting unit 202, the color conversion dictionary determination unit 203, the color conversion unit 204, and the display control unit 205 are the same as those described in the first embodiment.

The color conversion dictionary candidate selection unit 206 selects and extracts a plurality of pieces of information from the first of the color conversion dictionary sorted by the color conversion dictionary sorting unit 202, and sends the candidates to the color conversion dictionary presenting unit 2052 as candidates of the color conversion dictionary to be selected by the user. The information of the color conversion dictionary extracted by the color conversion dictionary candidate selection unit 206 may include all information of the sorted color conversion dictionary.

The color conversion dictionary presentation unit 2052 of the display control unit 205 causes the display device 25 to display the presentation screen presenting the information of the plurality of color conversion dictionaries selected by the color conversion dictionary candidate selection unit 206 and the spot color information. FIG. 20 illustrates a presentation screen 1100 as an example of the presentation screen displayed by the color conversion dictionary presentation unit 2052.

As illustrated in FIG. 20, the presentation screen 1100 includes the color name of the spot color information, and information of each color conversion dictionary includes the name of the color conversion dictionary, information indicating the accuracy of the color value and the accuracy of the metallic value based on the color conversion dictionary ("color accuracy level" and "metallic accuracy level" illustrated in FIG. 20), and the predicted color when color conversion is performed by the color conversion dictionary. As illustrated in FIG. 20, the presentation screen 1100 includes a color conversion dictionary display area 1101, a detailed information button 1101a, a color conversion dictionary display area 1102, a detailed information button 1102a, a color conversion dictionary display area 1103, and a detailed information button 1103a, an enter button 1104, and a test print button 1105.

The color conversion dictionary display areas 1101, 1102, and 1103 are display areas for displaying information indicating the name of the color conversion dictionary, the predicted color, and the accuracy of the color value and the accuracy of the metallic value based on the respective color conversion dictionaries. In the example illustrated in FIG. 20, information of a color conversion dictionary with high metallic reproducibility is displayed in the color conversion dictionary display area 1101, information of a color conversion dictionary with high color reproducibility is displayed in the color conversion dictionary display area 1103, and the color conversion dictionary display area 1102 displays information of a color conversion dictionary with intermediate reproduction properties.

The detailed information button 1101a is a button for displaying detailed information of the color conversion dictionary "color conversion dictionary A" displayed in the color conversion dictionary display area 1101 (for example, the Lab value corresponding to the spot color information, five-color device value, and the like whose spot color information is converted by the color conversion dictionary, as illustrated in FIG. 18).

The detailed information button 1102*a* is a button for displaying detailed information of the color conversion dictionary "color conversion dictionary B" displayed in the color conversion dictionary display area 1102 (for example, the Lab value corresponding to the spot color information, five-color device value, and the like whose spot color information is converted by the color conversion dictionary, as illustrated in FIG. 18).

The detailed information button 1103*a* is a button for displaying detailed information of the color conversion dictionary "color conversion dictionary C" displayed in the color conversion dictionary display area 1103 (for example, the Lab value corresponding to the spot color information, five-color device value, and the like whose spot color information is converted by the color conversion dictionary, as illustrated in FIG. 18).

An enter button 1104 is a button to be pressed with any one of the color conversion dictionary display areas 1101, 1102 and 1103 selected to permit the use of the color conversion dictionary corresponding to the selected color conversion dictionary display area. Also, by pressing the enter button 1104, the color conversion dictionary corresponding to the unselected color conversion dictionary display area is rejected.

The test print button 1105 is a button to be pressed to perform test printing collectively by the image forming apparatus 30 using each of the color conversion dictionary displayed on the presentation screen 1100, with the five-color device value converted to reproduce the spot color indicated by the displayed spot color information. As a result, the user can compare and confirm the color tone and metallicity of the print result obtained by each color conversion dictionary.

The result input unit 2053 receives a result indicating which color conversion dictionary is permitted by pressing the enter button 1104 on the presentation screen 1100 presented on the display device 25. The result input unit 2053 sends the result to the color conversion dictionary determination unit 203.

The print job acquisition unit 201, the color conversion dictionary sorting unit 202, the color conversion dictionary determination unit 203, the color conversion unit 204, the display control unit 205, and the color conversion dictionary candidate selection unit 206 described above are implemented by executing a program by the CPU 601 illustrated in FIG. 6. At least a part of the functional units of the controller 20 illustrated in FIG. 19 implemented by software (programs) may be implemented by hardware circuits such as the FPGA or ASIC.

Further, each functional unit of the controller 20 illustrated in FIG. 19 conceptually illustrates a function and is not limited to such a configuration. For example, a plurality of functional units illustrated as independent functional units in the controller 20*a* illustrated in FIG. 19 may be configured as one functional unit. On the other hand, in the controller 20*a* illustrated in FIG. 19, a function of one functional unit may be divided into a plurality of units to be configured as a plurality of functional units.

As described above, in the controller 20*a* of the information processing system 1 according to the present embodiment, the color conversion dictionary sorting unit 202 calculates the difference value between the value indicating the physical property of the printing paper selected by the paper selection unit 2051 and the value indicating the physical property of each representative paper, and sorts based on the calculated difference value, the color conversion dictionary candidate selection unit 206 selects a plurality of difference values from the difference values sorted by the color conversion dictionary sorting unit 202, the color conversion dictionary presenting unit 2052 presents information of each color conversion dictionary corresponding to the plurality of difference values selected by the color conversion dictionary candidate selection unit 206 through the display device 25, and the color conversion unit 204 performs color conversion of spot colors in the print job using the color conversion dictionary selected and permitted by the operational input received by the result input unit 2053, among the color conversion dictionaries presented by the color conversion dictionary presentation unit 2052. As a result, a plurality of color conversion dictionary candidates can be compared within one screen, and selection of the color conversion dictionary can be made more in line with the user's intention.

An information processing system 1 according to a third embodiment is described, focusing on points that are different from the information processing system 1 according to the second embodiment. In the present embodiment, an operation of selecting a plurality of candidates from the first of the sorted color conversion dictionary and collectively presenting together with the paper type is described. The overall configuration of the information processing system 1 according to the present embodiment, the hardware configuration of the information processing apparatus 10, the controller 20*a*, and the image forming apparatus 30, and the functional configuration of the information processing apparatus 10 are the same as those of the second embodiment.

Figure 21:
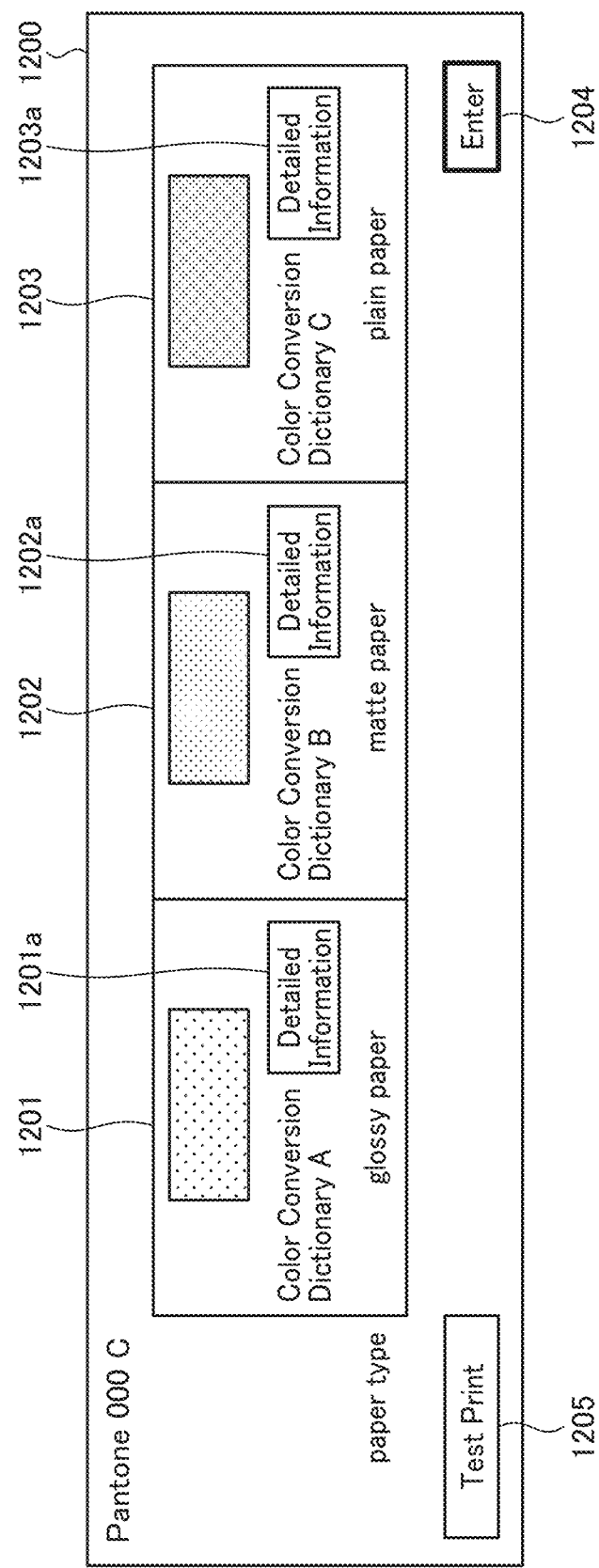
FIG. 21 is a diagram illustrating an example of the presentation screen displayed by the display device according to a third embodiment.
Figure 22:
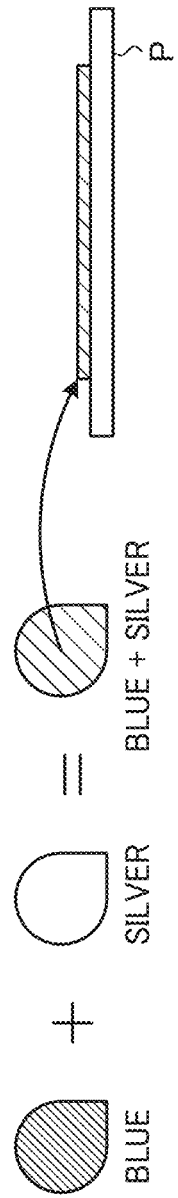
FIG. 22 is a diagram illustrating offset printing.
Figure 23:
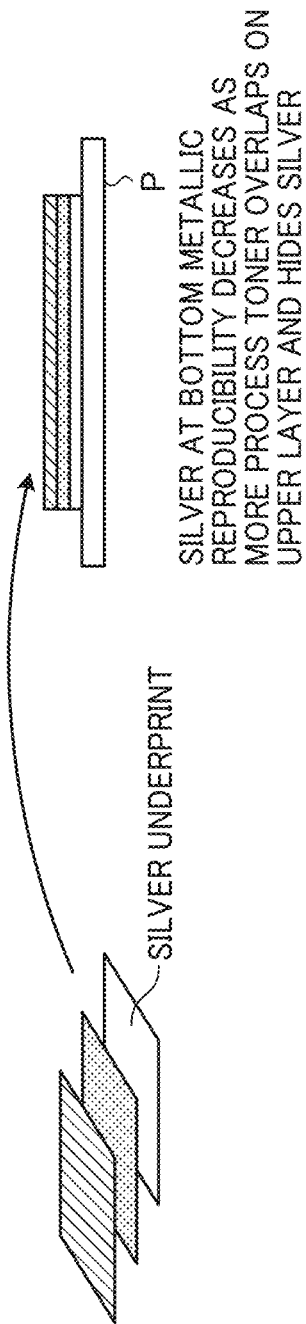
FIG. 23 is a diagram illustrating electrophotographic printing.

FIG. 21 is a diagram illustrating an example of the presentation screen displayed by the display device according to the third embodiment. The operation of the functional blocks of the controller 20*a* according to the present embodiment is described with reference to FIG. 21. The functional block configuration of the controller 20*a* according to the present embodiment is the same as the configuration described in the second embodiment.

The color conversion dictionary candidate selection unit 206 selects and extracts a plurality of pieces of information from the first of the color conversion dictionary sorted by the color conversion dictionary sorting unit 202, and sends the candidates to the color conversion dictionary presenting unit 2052 as the color conversion dictionary candidates to be selected by the user. The information of the color conversion dictionary extracted by the color conversion dictionary candidate selection unit 206 may include all information of the sorted color conversion dictionary.

The color conversion dictionary presentation unit 2052 of the display control unit 205 causes the display device 25 to display the presentation screen presenting the information of the plurality of color conversion dictionaries selected by the color conversion dictionary candidate selection unit 206 and the spot color information. FIG. 21 illustrates a presentation screen 1200 as an example of the presentation screen displayed by the color conversion dictionary presentation unit 2052.

As illustrated in FIG. 21, the presentation screen 1200 includes, as presentation contents, the color name of the spot color information, and as information of each color conversion dictionary, the paper type of representative paper corresponding to each color conversion information, the name of the color conversion dictionary, and the predicted color when color conversion is performed by the color conversion dictionary. As illustrated in FIG. 21, the presentation screen 1200 includes a color conversion dictionary display area 1201, a detailed information button 1201*a*, a color conversion dictionary display area 1202, a detailed information button 1202*a*, a color conversion dictionary display area 1203, and a detailed information button 1203*a*, an enter button 1204, and a test print button 1205.

The color conversion dictionary display areas 1201, 1202 and 1203 are display areas for displaying the name of the color conversion dictionary, the predicted color, and the paper type of the representative paper corresponding to the color conversion dictionary. As illustrated in FIG. 21, in the color conversion dictionary display area 1201, information of a color conversion dictionary with high metallic reproducibility is displayed, because the glossiness or smoothness of the representative paper corresponding to the color conversion dictionary is high. Therefore, since printing paper with high glossiness or smoothness is generally glossy paper, in the example illustrated in FIG. 21, "glossy paper" is displayed as the paper type of the representative paper in the color conversion dictionary display area 1201. Also, as the glossiness or smoothness of the printing paper decreases, the paper type generally becomes matte paper or plain paper. In the example illustrated in FIG. 21, the color conversion dictionary display area 1202 displays "matte paper" as the representative paper type, and the color conversion dictionary display area 1203 displays "plain paper" as the representative paper type.

The detailed information button 1201*a* is a button for displaying detailed information of the color conversion dictionary "color conversion dictionary A" displayed in the color conversion dictionary display area 1201 (for example, the Lab value corresponding to the spot color information, five-color device value, and the like whose spot color information is converted by the color conversion dictionary, as illustrated in FIG. 18).

The detailed information button 1202*a* is a button for displaying detailed information of the color conversion dictionary "color conversion dictionary B" displayed in the color conversion dictionary display area 1202 (for example, the Lab value corresponding to the spot color information, five-color device value, and the like whose spot color information is converted by the color conversion dictionary, as illustrated in FIG. 18).

The detailed information button 1203*a* is a button for displaying detailed information of the color conversion dictionary "color conversion dictionary C" displayed in the color conversion dictionary display area 1203 (for example, the Lab value corresponding to the spot color information, five-color device value, and the like whose spot color information is converted by the color conversion dictionary, as illustrated in FIG. 18).

The enter button 1204 is a button to be pressed with any one of the color conversion dictionary display areas 1201, 1202, and 1203 selected to permit the use of the color conversion dictionary corresponding to the selected color conversion dictionary display area.

The test print button 1205 is a button to be pressed to perform test printing collectively by the image forming apparatus 30 using each of the color conversion dictionaries displayed on the presentation screen 1200, with the five-color device value converted to reproduce the spot color indicated by the displayed spot color information. As a result, the user can compare and confirm the color tone and metallicity of the print result obtained by each color conversion dictionary.

The result input unit 2053 receives a result indicating which color conversion dictionary is permitted by pressing the enter button 1204 on the presentation screen 1200 displayed on the display device 25. The result input unit 2053 sends the result to the color conversion dictionary determination unit 203.

As described above, in the controller 20*a* of the information processing system 1 according to the present embodiment, the color conversion dictionary presentation unit 2052 presents the paper type of the representative paper corresponding to the color conversion dictionary as information of the color conversion dictionary. Accordingly, the paper type that the color conversion dictionary is suitable for can be obtained, and selection of the color conversion dictionary suitable for the printing paper to be used is facilitated.

In the above-described embodiments the description is made based on the image forming apparatus 30 that uses metallic color toner such as silver toner and gold toner. The above-described embodiments are not limited to this configuration, and the above-described embodiments may also be applied to an image forming apparatus that performs printing using a lustrous colorant such as a pearl colorant, which has a different color tone depending on the viewing direction.

In each of the above-described embodiments, in the case at least one of the functional units of the information processing apparatus 10 and the controllers 20 and 20*a* are implemented by executing a program, the program is pre-installed in the ROM or the like and provided. Further, in each of the above-described embodiments, the programs executed by the information processing apparatus 10 and the controllers 20 and 20*a* may be provided by being recorded in a computer-readable recording medium such as a compact disc read only memory (CD-ROM), a flexible disk (FD), a compact disc-recordable (CD-R), a digital versatile disc (DVD), or a secure digital (SD) card as a file in an installable format or an executable format.

In each of the above-described embodiments, the programs executed by the information processing apparatus 10 and the controllers 20 and 20*a* may be stored in a computer connected to a network such as the internet and provided by being downloaded through the network. Further, in each of the above-described embodiments, the programs executed by the information processing apparatus 10 and the controllers 20 and 20*a* may be provided or distributed through a network such as the internet. Further, in each of the above-described embodiments, the programs executed by the information processing apparatus 10 and the controllers 20 and 20*a* have a module configuration that includes at least one of the above-described functional units, and as actual hardware, the CPU 601 reads and executes the program from the above-described storage device (ROM 602, auxiliary storage device 605, etc.), and each functional unit described above is loaded onto the main storage device (RAM 603) and generated.

Aspects of the present disclosure are, for example, as follows.

According to a first aspect, an information processing apparatus includes a first acquisition unit for acquiring a print job, a first selection unit for selecting printing paper according to an operation on an operation unit, a second acquisition unit for acquiring a color conversion dictionary from among color conversion dictionaries corresponding to the respective representative paper sorted into a plurality of groups, based on the physical property of the printing paper selected by the first selection unit, a presentation unit for presenting information of the color conversion dictionary acquired by the second acquisition unit through a display unit, an input unit for receiving an operational input indicating whether to permit or to reject the presented color conversion dictionary through the operation unit, and a color conversion unit for converting color information of the print job using the color conversion dictionary permitted by the operational input received by the input unit.

According to a second aspect, in the information processing apparatus of the first aspect, the second acquisition unit calculates a difference value between a value indicating the physical property of the printing paper selected by the first selection unit and a value indicating the physical property of each of the representative paper, sorts based on calculated difference values, and arranges the difference value corresponding to the representative paper of the group to which the printing paper belongs to the first of the sorted difference values, and the presentation unit presents through the display unit, information of the color conversion dictionary corresponding to the first difference value among the sorted difference values, and in a case the presented color conversion dictionary is rejected according to the operational input received by the input unit, presents information of the color conversion dictionary corresponding to the difference value next to the difference value of the presented color conversion dictionary.

According to a third aspect, in the information processing apparatus of the first aspect, the second acquisition unit calculates a difference value between a value indicating the physical property of the printing paper selected by the first selection unit and a value indicating the physical property of each of the representative paper, sorts based on calculated difference values, and the information processing apparatus further includes a second selection unit for selecting a plurality of the difference values from among the difference values sorted by the second acquisition unit, the presentation unit presents through the display unit, information of each of the color conversion dictionaries corresponding to the plurality of the difference values selected by the second selection unit, and the color conversion unit converts the color information of the print job using the color conversion dictionary selected and permitted by the operational input received by the input unit from among the color conversion dictionaries presented by the presentation unit.

According to a fourth aspect, in the information processing apparatus of the second aspect or the third aspect, the second acquisition unit sorts the calculated difference values in ascending order.

According to a fifth aspect, in the information processing apparatus of the third aspect or the fourth aspect, the presenting unit presents information indicating accuracy of color reproducibility based on the color conversion dictionary, as information of the color conversion dictionary.

According to a sixth aspect, in the information processing apparatus of the fifth aspect, the color reproducibility is reproducibility of metallicity and reproducibility of color.

According to a seventh aspect, in the information processing apparatus of the third aspect or the fourth aspect, the presentation unit presents a paper type of the representative paper corresponding to the color conversion dictionary as the information of the color conversion dictionary.

According to an eighth aspect, in the information processing apparatus of any one of the first aspect to the seventh aspect, the physical property is at least one of glossiness or smoothness.

According to a ninth aspect, an information processing system includes a third acquisition unit for acquiring colorimetric values of target color patches of a plurality of kinds of printing paper measured by a measuring instrument and physical properties of the plurality of kinds of printing paper measured by the measuring instrument, a sorting unit for sorting the plurality of kinds of printing paper into groups based on the physical properties acquired by the third acquisition unit, a third selection unit for selecting the representative paper from the paper belonging to each of the groups sorted by the sorting unit, a creation unit for creating the color conversion dictionary corresponding to the representative paper from the colorimetric values of the representative paper, and the information processing apparatus of any one of the first aspect to the eighth aspect.

According to a tenth aspect, an information processing method includes a first acquisition step of acquiring a print job, a selection step of selecting printing paper according to an operation on the operation unit, a second acquisition step of acquiring a color conversion dictionary from among the color conversion dictionaries corresponding to respective representative paper sorted into a plurality of groups, based on physical property of the selected printing paper, a presentation step of presenting the acquired information of the color conversion dictionary through a display unit, an input step of receiving an operational input indicating whether to permit or to reject the presented color conversion dictionary through the operation unit, and a color conversion step of converting color information of the print job, using the color conversion dictionary permitted by the received operational input.

According to an eleventh aspect, a program to cause a general computer to perform a first acquisition step of acquiring a print job, a selection step of selecting printing paper according to an operation on the operation unit, a second acquisition step of acquiring a color conversion dictionary based on physical property of the selected printing paper among color conversion dictionaries corresponding to representative paper sorted into multiple groups, a presentation step of presenting the acquired information of the color conversion dictionary through a display unit, an input step of receiving an operational input indicating whether to permit or to reject the presented color conversion dictionary through the operation unit, and a color conversion step of converting the color information of the print job, using the color conversion dictionary permitted by the received operational input.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising: circuitry configured to:
    acquire a print job;
    select printing paper according to an operation on an operation device;
    acquire a color conversion dictionary from among color conversion dictionaries corresponding to respective representative paper sorted into a plurality of groups based on a physical property of the selected printing paper;
    calculate a difference value between a value indicating the physical property of the selected printing paper and a value indicating the physical property of each of the representative paper;
    sort the calculated difference values;
    arrange the difference value corresponding to representative paper of a group to which the printing paper belongs, to a top of the sorted difference values;
    present information on the color conversion dictionary corresponding to the difference value arranged at the top among the sorted difference values through a display;
    receive an operation input indicating whether to accept or to reject a presented color conversion dictionary through the operation device;
    convert color information of the print job using the color conversion dictionary accepted by the operation input received through the operation device; and
    in a case the presented color conversion dictionary is rejected according to operation input received through the operation device information on the color conversion dictionary to the difference value next to the difference value of the presented color conversion dictionary.

2. The information processing apparatus of claim 1, wherein the circuitry is further configured to:
    select a plurality of the difference values from among the sorted difference values;
    present through the display, information on each of the color conversion dictionaries corresponding to the plurality of the difference values; and
    convert the color information on the print job using the color conversion dictionary selected and accepted by the operation input from among the color conversion dictionaries.

3. The information processing apparatus of claim 1, wherein
    the circuitry is configured to sort the calculated difference values in ascending order.

4. The information processing apparatus of claim 2, wherein
    the circuitry is configured to present information indicating accuracy of color reproducibility based on the color conversion dictionary as information on the color conversion dictionary.

5. The information processing apparatus of claim 4, wherein
    the color reproducibility includes reproducibility of metallicity and reproducibility of color.

6. The information processing apparatus of claim 2, wherein the circuitry is configured to present a paper type of the representative paper corresponding to the color conversion dictionary as the information on the color conversion dictionary.

7. The information processing apparatus of claim 1, wherein
    the physical property is at least one of glossiness or smoothness.

8. An information processing system comprising:
    another circuitry configured to:
    acquire colorimetric values of target color patches on a plurality of kinds of printing paper measured by a measuring instrument and physical property of the plurality of kinds of printing paper measured by the measuring instrument;
    sort the plurality of kinds of printing paper into a plurality of groups based on the physical property;
    select representative paper from the printing paper belonging to each of the groups;
    create a color conversion dictionary corresponding to the representative paper from colorimetric values of the representative paper; and
    the information processing apparatus of claim 1.

9. An information processing method comprising:
    acquiring a print job;
    selecting printing paper according to an operation on an operation device;
    acquiring a color conversion dictionary from among color conversion dictionaries corresponding to respective representative paper sorted into a plurality of groups, based on a physical property of the selected printing paper;
    calculating a difference value between a value indicating the physical property of the selected printing paper and a value indicating the physical property of each of the representative paper;
    sorting the calculated difference values;
    arranging the difference value corresponding to representative paper of a group to which the printing paper belongs, to a top of the sorted difference values;
    presenting information on the color conversion dictionary corresponding to the difference value arranged at the top among the sorted difference values through a display;
    receiving an operation input indicating whether to accept or to reject a presented color conversion dictionary through the operation device;
    converting color information of the print job, using the color conversion dictionary accepted by the received operation input; and
    in a case the presented color conversion dictionary is rejected according to operation input received through the operation device, present information on the color conversion dictionary corresponding to the difference value next to the difference value of the presented color conversion dictionary.

10. A non-transitory recording medium storing a plurality of instructions which, when executed by one or more processors, causes the processors to perform an information processing method comprising:
    acquiring a print job;
    selecting printing paper according to an operation on an operation device;
    acquiring a color conversion dictionary from among color conversion dictionaries corresponding to respective representative paper sorted into a plurality of groups, based on a physical property of the selected printing paper;

calculating a difference value between a value indicating the physical property of the selected printing paper and a value indicating the physical property of each of the representative paper;

sorting the calculated difference values;

arranging the difference value corresponding to representative paper of a group to which the printing paper belongs, to a top of the sorted difference values;

presenting information on the color conversion dictionary corresponding to the difference value arranged at the top among the sorted difference values through a display;

receiving an operation input indicating whether to accept or to reject a presented color conversion dictionary through the operation device;

converting color information of the print job, using the color conversion dictionary accepted by the received operation input; and in a case the presented color conversion dictionary is rejected according to operation input received through the operation device, present information on the color conversion dictionary corresponding to the difference value next to the difference value of the presented color conversion dictionary.

* * * * *